United States Patent [19]

Withers et al.

[11] Patent Number: 5,115,219
[45] Date of Patent: May 19, 1992

[54] SUPERCONDUCTING MAGNETIC ENERGY STORAGE APPARATUS STRUCTURAL SUPPORT SYSTEM

[75] Inventors: Gregory J. Withers; Stephen W. Meier, both of Bolingbrook; Robert J. Walter, Batavia; Michael D. Child, Naperville; Douglas W. DeGraaf, Downers Grove, all of Ill.

[73] Assignee: Chicago Bridge and Iron Technical Services, Oak Brook, Ill.

[21] Appl. No.: 532,902

[22] Filed: Jun. 4, 1990

[51] Int. Cl.$^5$ .............................................. H01F 7/22
[52] U.S. Cl. ..................................... 335/216; 335/300
[58] Field of Search ............... 335/216, 296, 299, 300, 335/301; 505/1, 879, 892, 894

[56] References Cited

U.S. PATENT DOCUMENTS

| | | | |
|---|---|---|---|
| 3,389,353 | 6/1968 | Kafka et al. | 335/216 |
| 3,391,288 | 7/1968 | Kafka | 310/11 |
| 3,480,895 | 11/1969 | Albrecht et al. | 336/60 |
| 3,919,677 | 11/1975 | Young et al. | 335/216 |
| 3,980,981 | 9/1976 | Boom et al. | 335/216 |
| 3,996,545 | 12/1976 | Elsel et al. | 336/92 |
| 4,032,959 | 6/1977 | Boom et al. | 323/44 F |
| 4,048,437 | 9/1977 | Vander Arend | 335/216 |
| 4,122,512 | 10/1978 | Peterson et al. | 363/14 |
| 4,379,275 | 4/1983 | Elsel | 335/216 |
| 4,418,325 | 11/1983 | Elsel | 335/216 |
| 4,482,878 | 11/1984 | Burgeson et al. | 335/216 |
| 4,549,156 | 10/1985 | Mine et al. | 335/216 |
| 4,622,531 | 11/1986 | Eyssa et al. | 335/216 |
| 4,800,354 | 1/1989 | Laskaris | 335/216 |
| 4,837,541 | 6/1989 | Pelc | 335/300 |
| 4,853,661 | 1/1989 | Palkovich | 335/216 |
| 4,872,314 | 10/1989 | Asano et al. | 62/49.1 |
| 4,872,322 | 10/1989 | Woods et al. | 62/51.1 |

Primary Examiner—Leo P. Picard
Assistant Examiner—Trinidad Korka
Attorney, Agent, or Firm—Marshall, O'Toole, Gerstein, Murray & Bicknell

[57] ABSTRACT

A superconducting magnetic energy storage apparatus comprising a cylindrical superconducting coil; a cylindrical coil containment vessel enclosing the coil and adapted to hold a liquid, such as liquefied helium; and a cylindrical vacuum vessel enclosing the coil containment vessel and located in a restraining structure having inner and outer circumferential walls and a floor; the apparatus being provided with horizontal compression members between (1) the coil and the coil containment vessel and (2) between the coil containment vessel and the vacuum vessel, compression bearing members between the vacuum vessel and the restraining structure inner and outer walls, vertical support members (1) between the coil bottom and the coil containment vessel bottom and (2) between the coil containment vessel bottom and the vacuum vessel bottom, and external supports between the vacuum vessel bottom and the restraining structure floor, whereby the loads developed by thermal and magnetic energy changes in the apparatus can be accommodated and the structural integrity of the apparatus be maintained.

60 Claims, 11 Drawing Sheets

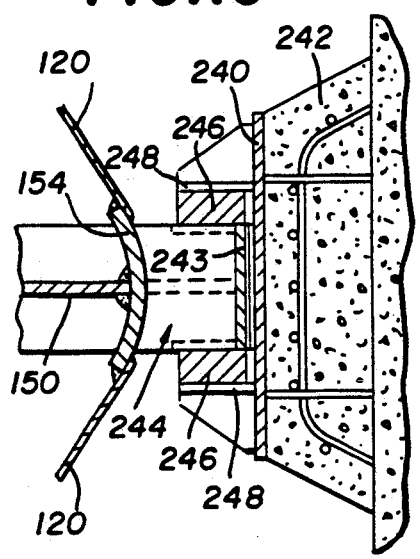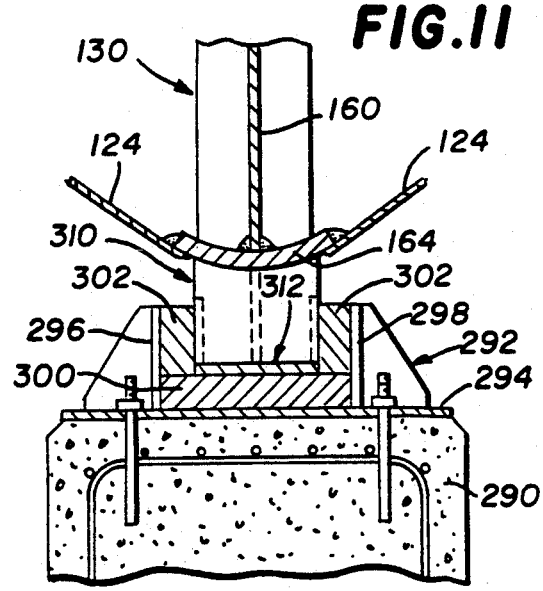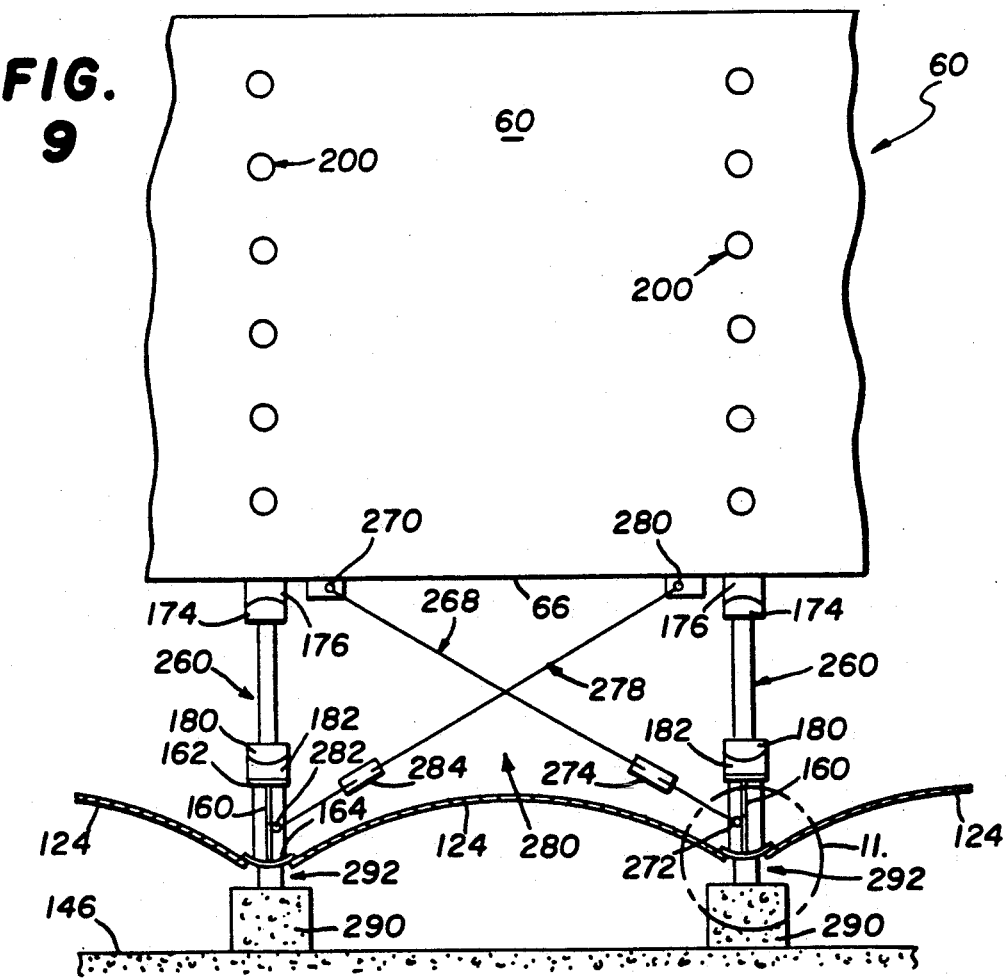

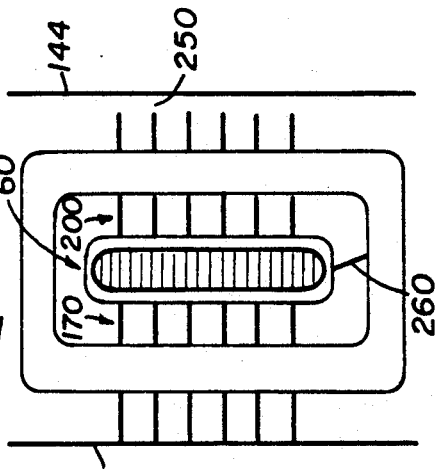
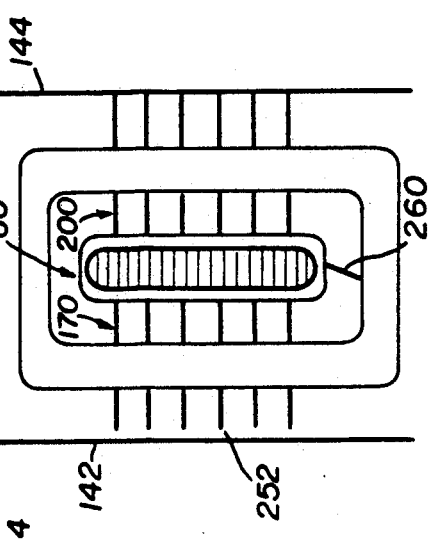
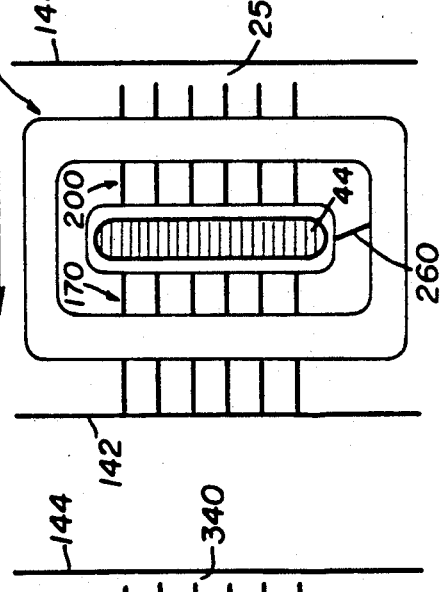
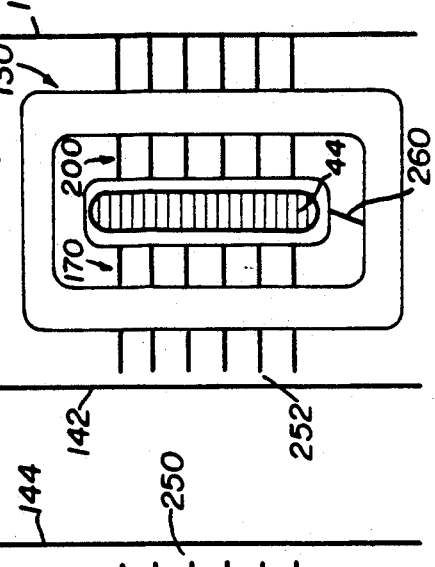
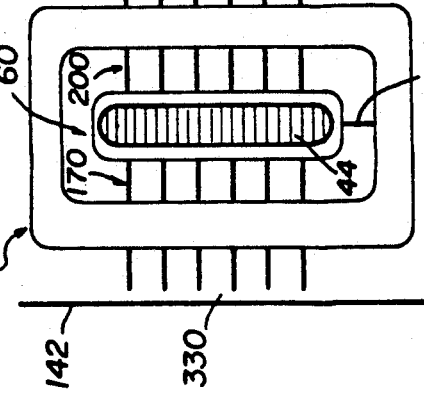
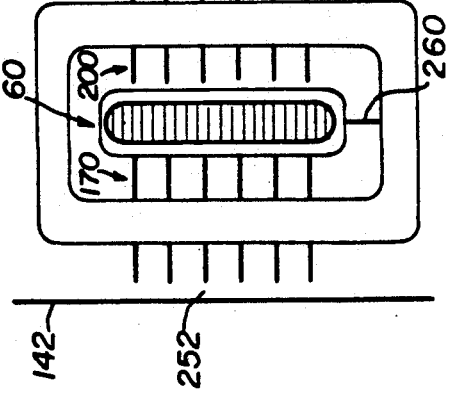

SUPERCONDUCTING MAGNETIC ENERGY STORAGE APPARATUS STRUCTURAL SUPPORT SYSTEM

This invention was made with Government support under Contract No. BNA-001-88-C-0027 awarded by the Defense Nuclear Agency. The Government has certain rights in this invention.

This invention relates to superconducting magnetic energy storage (SMES) apparatus. More particularly, this invention pertains to a structural support system for SMES apparatus which is capable of resisting radial and vertical loads due to thermal contraction, vacuum, gravity and magnetic loads produced by the superconducting coil.

BACKGROUND OF THE INVENTION

In recent years a substantial amount of research and engineering effort has been directed to the storage of electrical energy so that it would be available quickly and efficiently when needed, such as during high energy demand periods in the summer for air conditioning and in the winter for heating. It is also desirable to store electrical energy produced during the nighttime when consumption is low so that it is available for daytime use for peak shaving when demand is much greater, thereby permitting a power plant to run at a more uniform rate.

Electrical energy storage also may be used when it is desirable to generate power at a lower rate than at which it will be consumed, store the generated power in the form of electrical energy and subsequently release the stored energy to meet high rate consumption demands.

One form of electrical energy storage which has been studied extensively is the superconducting magnetic energy storage (SMES) system which is intended to operate at very low temperatures, i.e. cryogenic temperatures. One such system comprises a circular coil surrounded by a coil containment vessel containing liquefied helium at a temperature of 1.8° K. The liquefied helium cools the coil, generally aluminum, to make it superconducting by lowering electrical resistance. The coil containment vessel in turn is surrounded by a vacuum vessel, the main function of which is to minimize heat loads on the cryogenic system. A shroud between the coil containment vessel and the vacuum vessel, but surrounding the coil containment vessel, is generally also included to further prevent heat transfer. This is achieved by cooling the shroud with liquefied nitrogen. The entire apparatus as described is to be installed in a large circular trench or tunnel having inner and outer circumferential walls constructed to accept the radial compressive loads applied during operation of the SMES apparatus.

After a SMES apparatus is constructed and is ready to be put in use the vacuum vessel is evacuated to a suitable vacuum. This causes the vacuum vessel walls to move towards each other and also radially inwardly. The shroud is then cooled following which the coil is cooled down by filling the coil containment vessel with liquefied helium. This cooling causes the coil and coil containment vessel to contract and to move radially inwardly. After the coil is cooled to its operating temperature, the superconducting coil is charged with electricity. The charged coil produces a large radial outward magnetic load which is partially offset by the vacuum and thermal loads. In addition to the described loads, long term creep of the surrounding foundation will occur. Thus, all of these loads and movements must be accommodated while maintaining the structural and operating integrity of the SMES apparatus. This requires a structural support system having a capability of handling the changing loads as well as being able to handle the loads without compromising the thermal isolation of the superconducting coil.

One restrained coil support concept using various prestressed tension anchors extending into surrounding rock and soil has been proposed but is considered unreliable because of the surrounding nonhomogeneous soil or rock. Additionally, another drawback to tension anchors is their installation cost.

An initially unrestrained coil support concept has relied on an adjustable external strut system which allows the coil to cooldown without restraint, and then is engaged after cooldown to resist the operating magnetic loads. See U.S. Pat. Nos. 3,980,981 and 4,622,531. A potential problem with the unrestrained coil concept is that it requires an extremely flexible vacuum vessel capable of contracting with the coil during cooldown. The unrestrained coil concept introduces significant cost items to the SMES structure including an expensive adjustable external strut system and a vertical support system which must accommodate the large radial movements of the structure.

From the above discussion it is believed clear that an alternative SMES structural support system would be useful.

SUMMARY OF THE INVENTION

According to the invention a superconducting magnetic energy storage apparatus is provided comprising a generally cylindrical shaped superconducting coil structure; the coil structure having an inner circumferential face, an outer circumferential face and a bottom face; a generally cylindrically shaped coil containment vessel, surrounding and enclosing the coil structure, and adapted to hold a liquid; the coil containment vessel having an inner circumferential wall spaced inward of the coil structure inner circumferential face; the coil containment vessel having an outer circumferential wall, spaced outward of the coil structure outer circumferential face; the coil containment vessel having a bottom wall spaced downward of the coil structure bottom face; a generally cylindrically shaped vacuum vessel surrounding and enclosing the coil containment vessel; the vacuum vessel being located in a restraining structure having an inner circumferential wall, an outer circumferential wall and a floor; the vacuum vessel having an outer circumferential wall spaced inward of the restraining structure outer circumferential wall; the vacuum vessel having an inner circumferential wall spaced radially outward of the restraining structure inner circumferential wall; the vacuum vessel having a bottom spaced downward of the coil containment vessel bottom wall; coil support means supporting the coil structure bottom face above the coil containment vessel bottom wall; substantially horizontal compression member means between the coil structure outer face and the coil containment vessel outer wall, and substantially horizontal compression member means between the coil structure inner face and the coil containment vessel inner wall; substantially horizontal cold to warm compression member means between the cold coil containment vessel outer wall and the vacuum vessel warm outer wall and substantially horizontal compression member means between the coil containment vessel inner wall and the vacuum vessel inner wall; compression bearing means, on the outside of the vacuum vessel outer wall, aligned with compression bearing means on the restraining structure outer wall; compression bearing means, on the outside of the vacuum vessel inner wall, aligned with compression bearing means on the restraining structure inner wall; and the compression members being dimensioned such that when the coil containment vessel is loaded with a liquid cryogen, the vacuum vessel is evacuated to an operable system vacuum and the coil structure is substantially loaded with electrical energy, the outwardly directed compressive force exerted by the resulting magnetic energy causes the compression bearing means on the outside of the outer wall of the vacuum vessel to contact, and transfer the compressive load to, the compression bearing means on the restraining structure outer wall.

When the coil structure has a minimal electrical energy load of up to about 10% of the electrical energy storage capacity of the coil structure and the compression bearing means on the outside of the inner wall of the vacuum vessel contacts the compression bearing means on the restraining structure inner wall, an inwardly directed compressive force is exerted by the coil causing the compression bearing means on the outside of the inner wall of the vacuum vessel to contact the compression bearing means on, and transfer the inwardly directed compressive load to, the restraining structure inner wall.

At such time as the coil structure is substantially loaded with electrical energy and the compression bearing means on the outside of the outer wall of the vacuum vessel contacts the compression bearing means on the restraining structure outer wall, the compression bearing means on the outside of the inner wall of the vacuum vessel is spaced outwards from, and out of contact with, the compression bearing means on the restraining structure inner wall.

The compression members can be dimensioned such that when the coil containment vessel is loaded with a liquid cryogen, the vacuum vessel is evacuated to an operable system vacuum and the coil structure is essentially void of electrical energy, an inwardly directed compressive force is exerted causing the compression bearing means on the outside of the inner wall of the vacuum vessel to contact the compression bearing means on, and transfer the inwardly directed compressive load to, the restraining structure inner wall.

When the coil structure is essentially void of electrical energy the compression bearing means on the outside of the outer wall of the vacuum vessel is spaced from, and out of contact with, the compression bearing means on the restraining structure outer wall.

The substantially horizontal compression member means between the coil structure outer face and the coil containment vessel outer wall, and between the coil structure inner face and the coil containment vessel inner wall, can have spaced apart flexible fingers with the ends of the fingers in contact with one of the coil structure and the coil containment vessel. The flexible fingers can be attached to the coil containment vessel.

A plurality of vertical columns of fingers can be positioned along each of the circumferential inner and outer walls of the coil containment vessel and a plurality of vertically spaced apart fingers can be in each column.

The fingers can be flat elongated members horizontally positioned and fabricated of composite nonelectrically conducting material having a low heat conducting capacity.

The substantially horizontal compression member means between the coil containment vessel outer wall and the vacuum vessel outer wall, and between the coil containment vessel inner wall and the vacuum vessel inner wall, can be struts. Each strut can have two opposing ends and one strut end can be operatively associated with a coil containment vessel wall so that the strut can accommodate movement and deformation of said vessel wall, and the other end of the strut can be operatively associated with a vacuum vessel wall so that the strut can accommodate movement and deformation of the vacuum vessel wall.

More particularly, one strut end can be operatively joined through a ball and socket type joint to a coil containment vessel wall and the other end of the strut can be joined through a ball and socket type joint to a vacuum vessel wall.

Horizontally spaced apart vertical columns of horizontal struts can be positioned along the inner and outer walls of the vacuum vessel and a plurality of vertically spaced apart horizontal struts can be in each column; and each strut can have opposing ends and one strut end can be operatively associated with a coil containment vessel wall so that the strut can accommodate movement and deformation of the coil containment vessel wall and the other end of the strut can be operatively associated with a vacuum vessel wall so that the strut can accommodate movement and deformation of said vacuum vessel wall.

Each strut can be tubular and can be fabricated of composite non-electrically conducting material having a low heat conducting capacity. The struts may need to be non-conducting where eddy currents can occur with the coil containment vessel and vacuum vessel.

To a substantial extent each column of fingers can be radially aligned with a column of tubular struts so as to more directly transfer compressive loads through the coil containment vessel walls.

The compression bearing means on the outside of the vacuum vessel outer wall and the compression bearing means on the restraining structure outer wall can be arranged in horizontally spaced apart vertical columns aligned with the columns of horizontal struts along the vacuum vessel outer wall; and the compression bearing means on the outside of the vacuum vessel inner wall and the compression bearing means on the restraining means inner wall can be arranged in horizontally spaced apart vertical columns aligned with the columns of horizontal struts along the vacuum vessel outer wall.

A generally cylindrical shaped thermal shroud can be located between the coil containment vessel and the vacuum vessel, the shroud can surround the coil containment vessel and the vacuum vessel can surround the shroud.

The shroud can include tubes to which a fluid coolant can be fed to cool the shroud. Also, the struts can penetrate the shroud and thermal intercept means can communicate with the thermal shroud and with many of the struts to extract heat and decrease the amount of heat leak to the coil containment vessel.

The thermal intercept means can include a metal ring in contact with a strut and one or more compliant loops, such as loops made of a braided metal sheet, can extend from and be joined to the metal ring and to the thermal shroud. Many of the tubular struts can comprise a plurality of sections, the metal ring can be laterally positioned between adjacent ends of the two sections and a sleeve can be telescoped inside the adjacent ends of the two tubular sections and inside of the ring. A collar can be located on each axial side of and be joined to the metal ring, with each collar spaced radially outward of the sleeve thereby defining opposing axially positioned circular grooves in which fit the adjacent ends of the tubular struts.

A multilayer thermal insulation plug can be radially positioned inside some or all of the struts adjacent the thermal intercept means. Also, each tubular strut can have a vent hole for evacuating the strut interior when the vacuum vessel is evacuated. Furthermore, the tubular struts can have radially thicker wall portions at the ends than axially inwardly from the ends.

Spaced apart vertical compression members can extend from the coil containment vessel bottom to the vacuum vessel bottom and the compression members can accommodate relative lateral and vertical displacement between the coil containment vessel and the vacuum vessel. The bottom of the vacuum vessel can be supported by external support means located on the restraining means floor, and the external support means can accommodate relative lateral displacement between the coil containment vessel and the vacuum vessel.

The spaced apart vertical compression members can include substantially vertical struts. Each substantially vertical strut can have two opposing ends and one strut end can be operatively associated with the coil containment vessel bottom so that the strut can accommodate movement and deformation of the coil containment vessel bottom, and the other end of the vertical strut, can be operatively associated with the vacuum vessel bottom so that the strut can accommodate movement and deformation of the vacuum vessel bottom. More specifically, each vertical strut can have opposing ends and one strut end can be operatively joined through a ball and socket type joint to the coil containment vessel bottom and the other end of the strut can be joined through a ball and socket type joint to the vacuum vessel bottom.

Each vertical strut can be tubular and be fabricated of composite non-electrically conducting material having a low heat conducting capacity. The vertical struts may need to be non-conducting where eddy currents can occur with the coil containment vessel and vacuum vessel.

The vertical struts can penetrate the shroud and thermal intercept means can communicate with the thermal shroud and with many of the vertical struts to extract heat and decrease the amount of heat leak to the coil containment vessel. When the vertical struts are tubular the thermal intercept means can include a metal ring in contact with a vertical strut and one or more compliant loops, such as loops made of a braided metal sheet, can extend from and be joined to the metal ring and the thermal shroud.

Many of the vertical struts can comprise two sections, the metal ring can be laterally positioned between adjacent ends of the two sections and a sleeve can be telescoped inside the adjacent ends of the two tubular sections and inside of the ring. A collar can be located on each axial side of and be joined to the metal ring, with each collar spaced radially outward of the sleeve thereby defining opposing axially positioned circular grooves in which fit the adjacent ends of the tubular struts.

The external support means can include a base on the restraining means floor, a resilient block on the top of the base, and a leg having a lower end bearing on the resilient block and an upper end joined to the vacuum vessel bottom.

The coil structure can have a ripple profile in plan view; the coil containment vessel can have scalloped inner and outer walls formed of curved shell sections joined together by vertical joints; the vacuum vessel can have scalloped inner and outer walls formed of curved shell sections joined together by vertical joints; and the vacuum vessel can have an internal vertical frame at each vertical joint where two shell sections are joined together, with the vertical frame having an inner vertical side member adjoining the vacuum vessel inner wall, an outer vertical side member adjoining the vacuum vessel outer wall, a bottom horizontal member adjoining the vacuum vessel bottom and a top horizontal member adjoining the vacuum vessel top.

The invention also provides a method of stabilizing and supporting a superconducting electrical energy storage apparatus which includes a cylindrical coil containment vessel enclosing a coil structure and adapted to hold a liquid; and a cylindrical vacuum vessel enclosing the coil containment vessel and located in a restraining structure having inner and outer circumferential walls and a floor; the method comprising positioning horizontal compression member means between (1) the coil structure and the coil containment vessel and (2) between the coil containment vessel and the vacuum vessel; positioning compression bearing means between the vacuum vessel and the restraining structure inner and outer walls; positioning vertical support member means (1) between the coil bottom and the coil containment vessel bottom and (2) between the coil containment vessel bottom and the vacuum vessel bottom; and positioning external support means between the vacuum vessel bottom and the restraining structure floor; whereby the structural integrity of the apparatus is maintained when subjected to changing loads developed and applied to the apparatus by different thermal and magnetic energy conditions.

The horizontal compression member means (1) and (2) desirably are in substantial horizontal alignment. Also, the vertical support member means (1) and (2) desirably are in substantial vertical alignment.

The method includes dimensioning the horizontal compression member means (1) and (2) such that when the coil containment vessel is loaded with a liquid cryogen, the vacuum vessel is evacuated to an operable system vacuum and the coil structure is substantially loaded with electrical energy, the outwardly directed compressive force exerted by the resulting magnetic energy causes the compression bearing means on the outside of an outer wall of the vacuum vessel to contact, and transfer the compressive load to, the compression bearing means on the restraining structure outer wall.

Additionally, according to the method the horizontal compression member means (1) and (2) are dimensioned such that when the coil containment vessel is loaded with a liquid cryogen, the vacuum vessel is evacuated to an operable system vacuum and the coil structure is essentially void of electrical energy, an inwardly directed compressive force is exerted causing the compression bearing means on the outside of an inner wall of the vacuum vessel to contact the compression bearing means on, and transfer the inwardly directed compressive load to a restraining structure inner wall.

Further, when the coil structure of an apparatus is produced according to the method and is essentially void of electrical energy the compression bearing means on the outside of an outer wall of the vacuum vessel is spaced from, and out of contact with, the compression bearing means on the restraining structure outer wall.

In practicing the method the substantially horizontal compression member means between the coil structure and a coil containment vessel outer wall may be formed as spaced apart flexible fingers.

The substantially horizontal compression member means between an outer wall of the coil containment vessel and an outer wall of the vacuum vessel, and between an inner wall of the coil containment vessel and an inner wall of the vacuum vessel, may be formed as struts.

Each strut may have two opposing ends; one strut end may be positioned so as to be operatively associated with a coil containment vessel wall so that the strut can accommodate movement and deformation of said vessel wall; and the other end of the strut may be positioned so as to be operatively associated with a vacuum vessel wall so that the strut can accommodate movement and deformation of the vacuum vessel wall.

Also according to the method one strut end may be operatively joined through a ball and socket type joint to a coil containment vessel wall and the other end of the strut joined through a ball and socket type joint to a vacuum vessel wall.

The method furthermore includes positioning a generally cylindrical shaped thermal shroud between the coil containment vessel and the vacuum vessel, with the shroud surrounding the coil containment vessel and with the vacuum vessel surrounding the shroud. The struts may be positioned so they penetrate the shroud and thermal intercept means may be so located that it communicates with the thermal shroud and with many of the struts so as to extract heat and decrease the amount of heat leak to the coil containment vessel.

BRIEF DESCRIPTION OF THE DRAWINGS

FIG. 9 is a side elevational view, partially in section through the vacuum vessel, showing the support system for the coil containment vessel therein;

FIG. 10 is an enlarged view, partially in section, of the area within the circle 10 in FIG. 2;

FIG. 11 is an enlarged view, partially in section, of the area within the circle 11 in FIG. 9;

FIG. 16 illustrates schematically the position of the energy storage apparatus relative to the trench or tunnel walls when construction is completed and the exterior struts are installed with predetermined gaps adjacent the said walls;

FIG. 17 illustrates schematically the radial inward displacement of the apparatus when a vacuum is created in the vacuum vessel and atmospheric pressure is applied externally thereby closing the radially inner gap and transferring the compressive load to the trench or tunnel inner wall;

FIG. 18 illustrates schematically the radial inward displaced position of the apparatus when it is cooled down by a liquefied helium charge which causes the coil structure and coil containment vessel to contract thereby compressing the radial inner exterior struts while the cold to warm struts in the vacuum vessel remain compressed but deflect downwardly as the coil structure contracts vertically;

FIG. 19 illustrates schematically the radial outward displacement of the apparatus when a magnetic load, such as up to about 10% of capacity, is developed adequate to overcome the inward loads developed by cooling and creation of the vacuum;

FIG. 20 illustrates schematically further radial outward displacement of the apparatus with increased development of a magnetic load above about 10% of capacity whereby the outer exterior struts resist the load and transfer it to the trench or tunnel radial outer wall;

FIG. 21 illustrates schematically the radial outward displacement of the apparatus immediately after the helium is dumped from the coil containment vessel in an emergency and, initially, the magnetic, thermal and pressure loads increase compression on the trench or tunnel outer wall and which load decreases rapidly as the magnetic load falls;

DETAILED DESCRIPTION OF THE DRAWINGS

To the extent it is reasonable and practical the same or similar elements which appear in the various views of the drawings will be identified by the same numbers.

Figure 1:
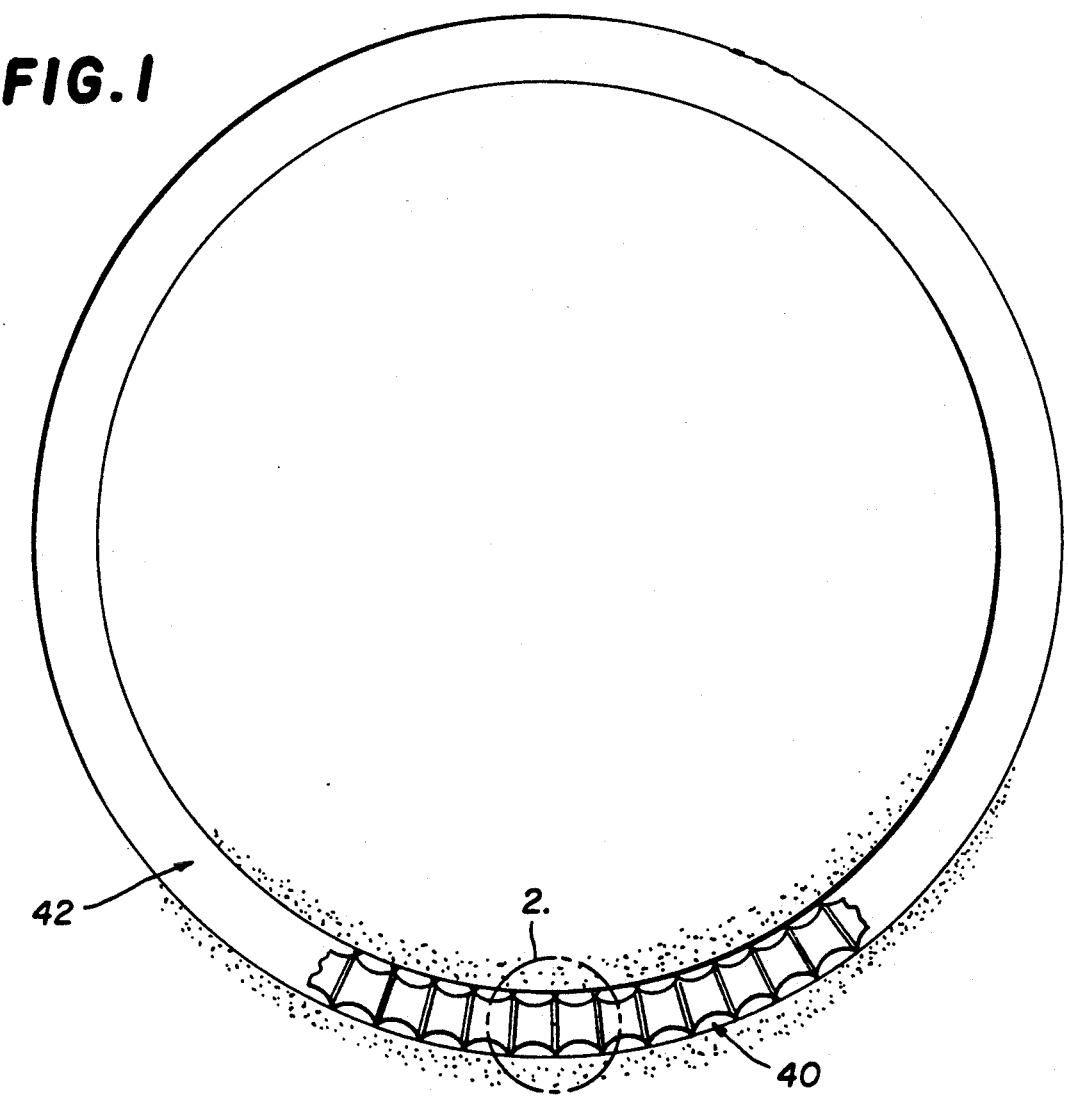
FIG. 1 is a plan view of a portion of a superconducting magnetic energy storage apparatus according to the invention.

With reference to FIG. 1 of the drawings the superconducting magnetic energy storage apparatus 40, only a portion of which is illustrated, is constructed in a circular restraining structure comprising a trench 42 excavated from solid earth or bedrock. The trench can be about fifteen to fifty feet wide, about fifty to one hundred or more feet deep and have a radius of about one hundred to six hundred feet although it should be understood that the subject invention is not limited to such dimensions.

Figure 7:
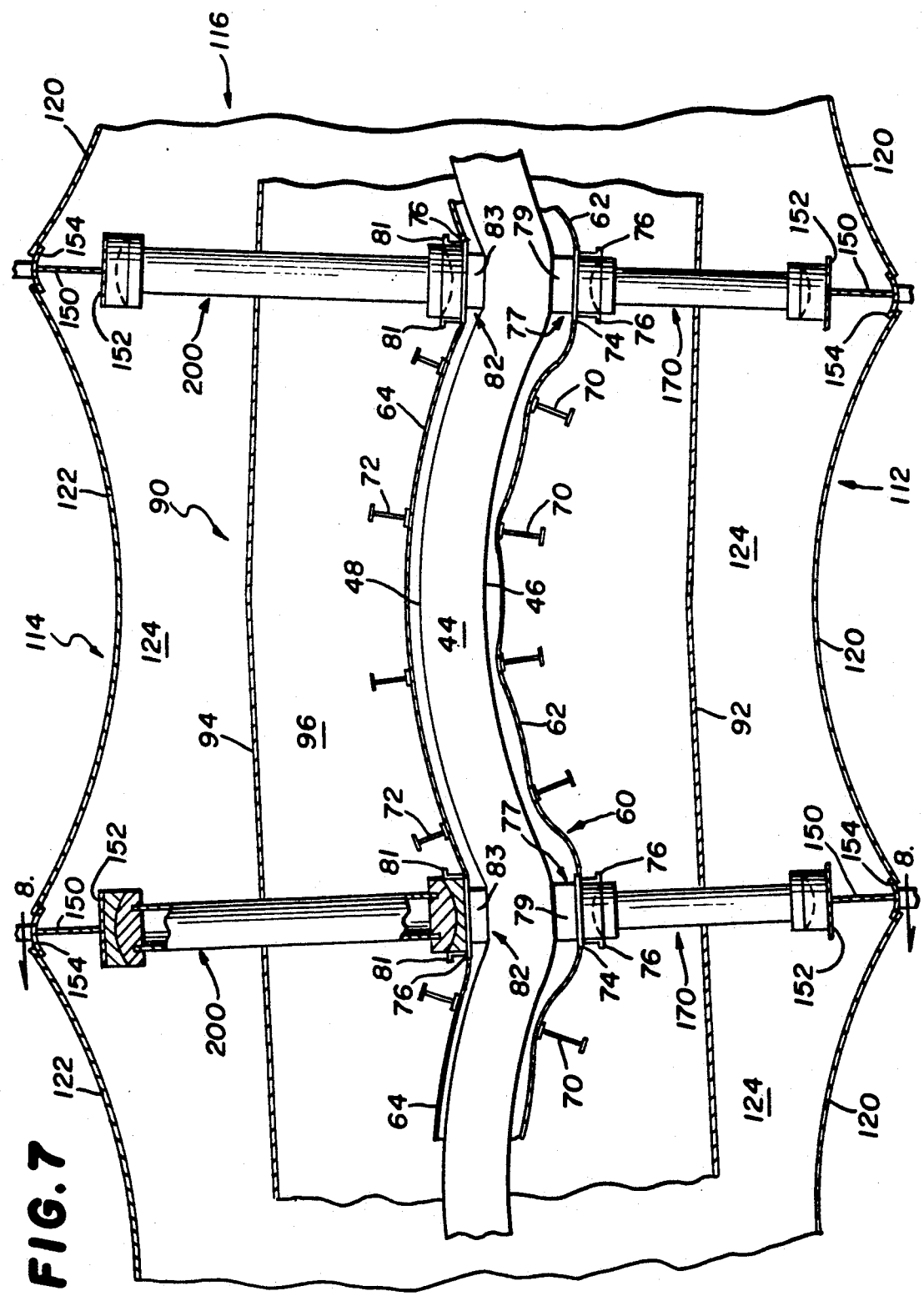
FIG. 7 is a sectional view, partially broken away, taken along the line 7—7 of FIG. 4.
Figure 12:
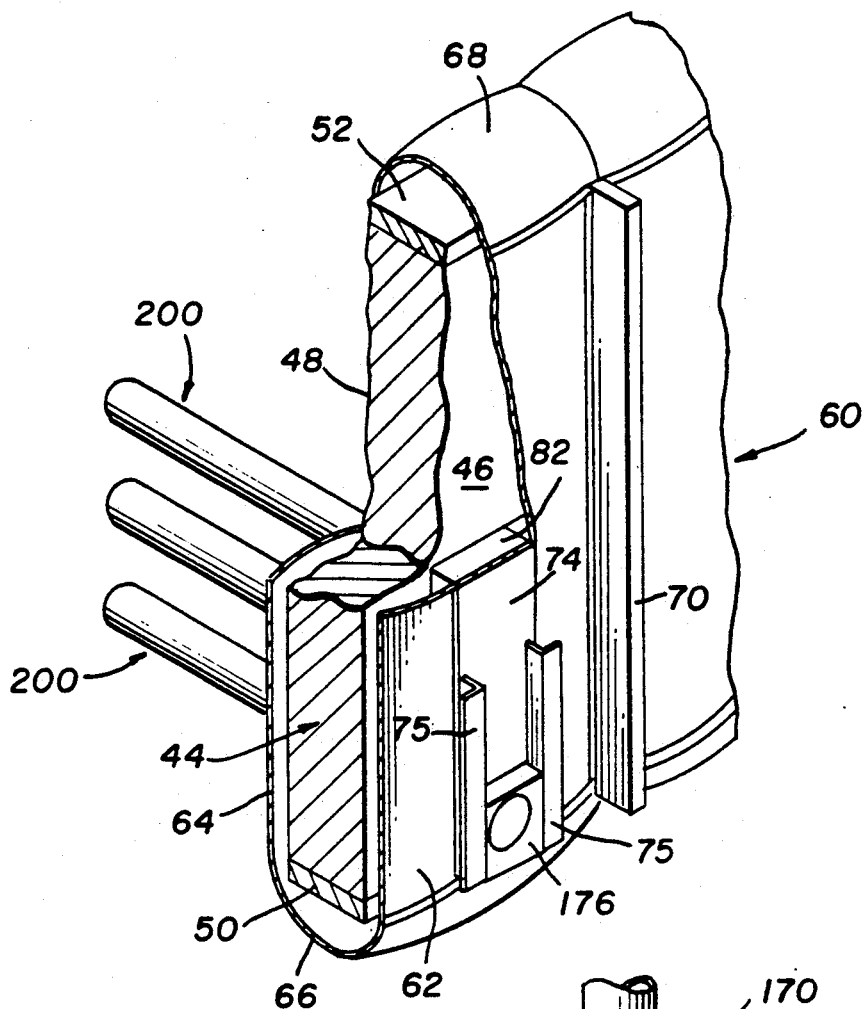
FIG. 12 is an isometric diagrammatic view illustrating the arrangement of the coil, coil containment vessel and support structures.

The magnetic energy storage apparatus includes a generally cylindrical shaped coil structure 44 shown with a rippled configuration, the preferred arrangement (FIG. 7). The coil structure 44 has an inner circumferential vertical face 46, an outer circumferential vertical face 48, a bottom 50 and a top 52 (FIG. 12). The coil structure 44 is surrounded in close proximity by a generally cylindrical shaped coil containment vessel 60 for liquefied helium which is to be equipped for rapid removal of the helium in case of an emergency. Such equipment is not part of this invention so it is not illustrated nor will it be described herein.

The vessel 60, which is a coil containment vessel but which in this embodiment is also a cryogenic or helium vessel since it is to contain liquefied helium, has an inner circumferential wall 62 spaced radial inward of the coil structure inner face 46. The coil containment or helium vessel 60 outer circumferential wall 64 is spaced radial outward of the coil structure outer circumferential face 48. Likewise, the coil containment vessel bottom wall 66 is spaced downward of the coil structure bottom face 50 while the coil containment vessel top wall 68 is spaced upward of the coil structure top face 52 (FIG. 12).

The inner and outer circumferential walls of the coil containment vessel 60 can be scalloped or rippled and formed of curved shell sections joined together by vertical joints.

The outer wall 64 of the coil containment vessel 60 is provided with spaced apart vertical reinforcing members 70 located at the vertical joints. Similarly, the inner wall 62 of the coil containment vessel 60 is provided with spaced apart vertical reinforcing members 72, located at the vertical joints (FIGS. 7 and 13).

Figure 13:
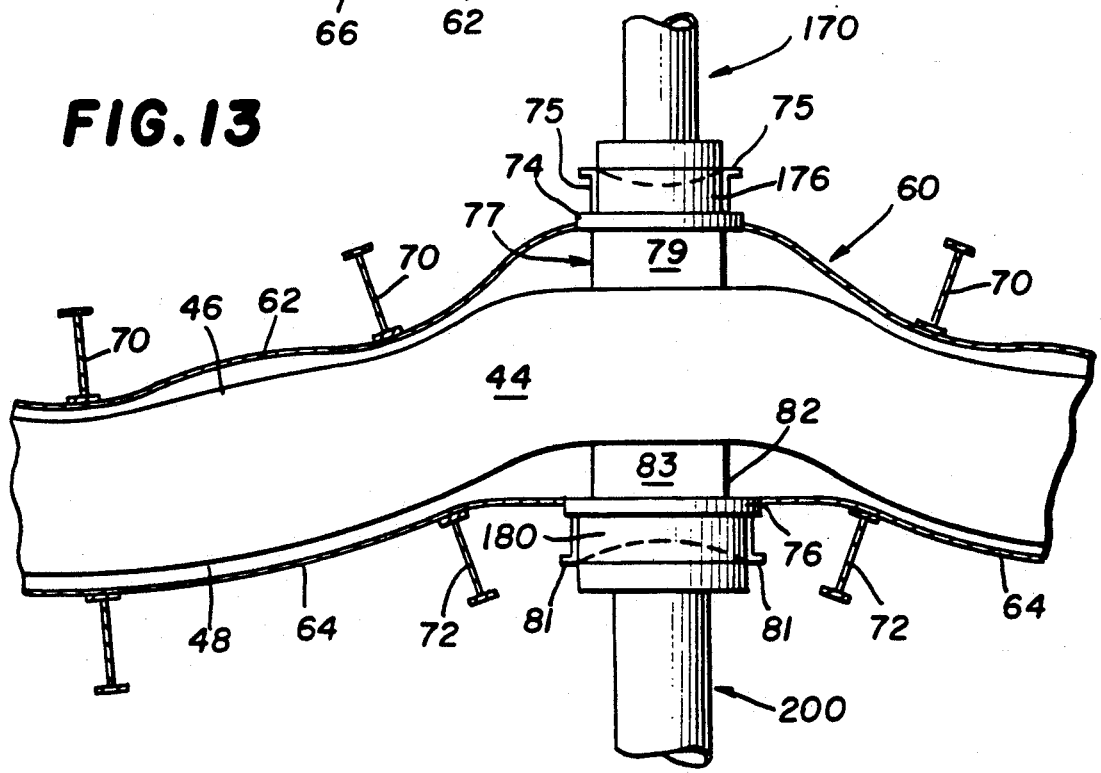
FIG. 13 is an enlarged view of a portion of FIG. 7.

The coil containment vessel 60 inner circumferential wall 62 includes a plurality of horizontally spaced apart vertical interface plates 74 which are each externally reinforced radially by a pair of vertical spaced apart angle stiffeners 75 joined near the vertical edges of the interface plate 74 (FIGS. 7, 12 and 13). A vertical column 77 of horizontal interface fingers 79 is mounted on the radial internal surface of each interface plate 74. The fingers 79 are held vertically spaced apart by spacers 80, which can be metal or composite bars, attached to interface plate 74 (FIG. 27).

The coil containment vessel outer circumferential wall 64 includes a plurality of horizontally spaced apart vertical interface plates 76 which are radially inwardly reinforced by a pair of vertical spaced apart angle stiffeners 81 joined thereto near the vertical edges of the reinforcing plate 76 (FIGS. 7, 12 and 13). A vertical column 82 of horizontal interface fingers 83, like 77,79 in FIG. 27, is mounted on the radial external surface of each interface plate 76 which is like interface plate 74. The fingers 83 are held vertically spaced apart by spacers, such as spacers 80 shown in FIG. 27.

Figure 27:
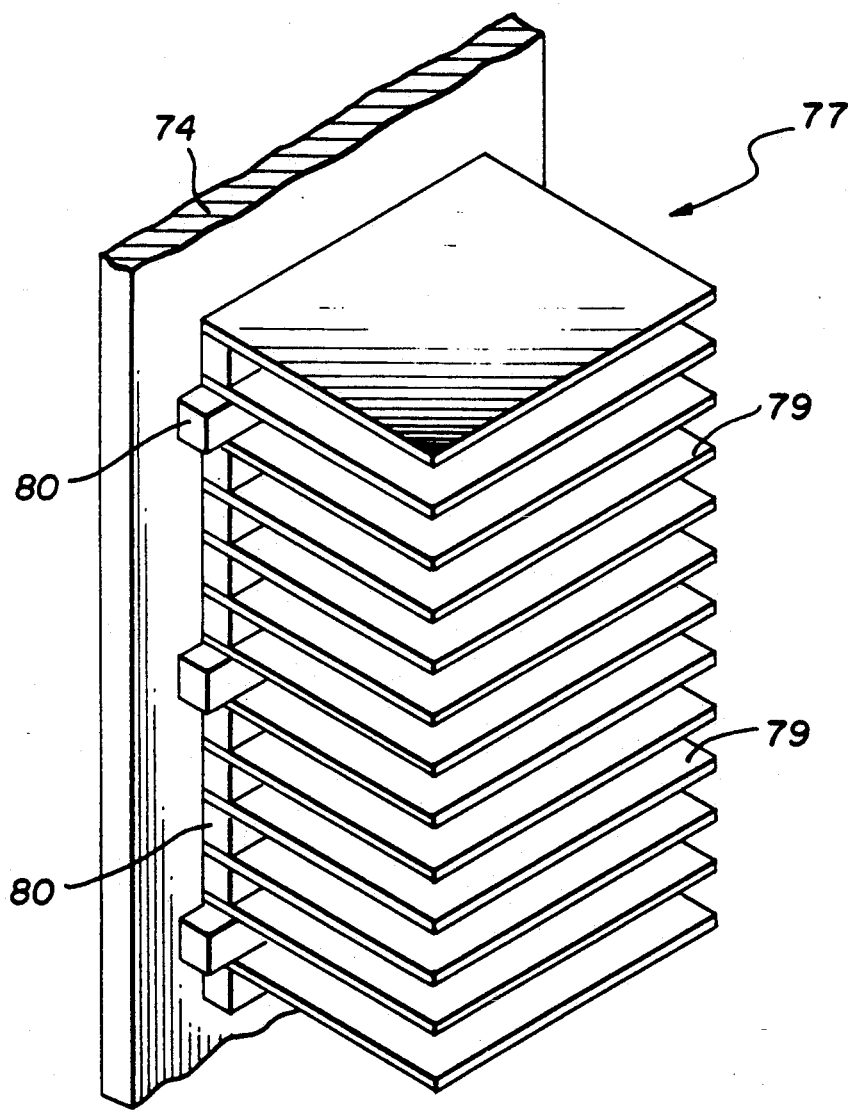
FIG. 27 is an isometric view of a vertical column of fingers which transfer compressive loads between the coil vertical faces and the coil containment vessel vertical walls.

The fingers 79 contact the inner vertical face 46 of the coil structure 44, while the fingers 83 contact the outer vertical face 48 of the coil structure 44 (FIGS. 7 and 27). The fingers 79,83 are moderately flexible and can accommodate relative movement between the coil structure and the coil containment vessel 60.

Multilayer thermal insulation may surround the helium vessel for maximum effectiveness. The thermal insulation can constitute multiple layers of aluminized Mylar and a polyester separator.

Figure 8:
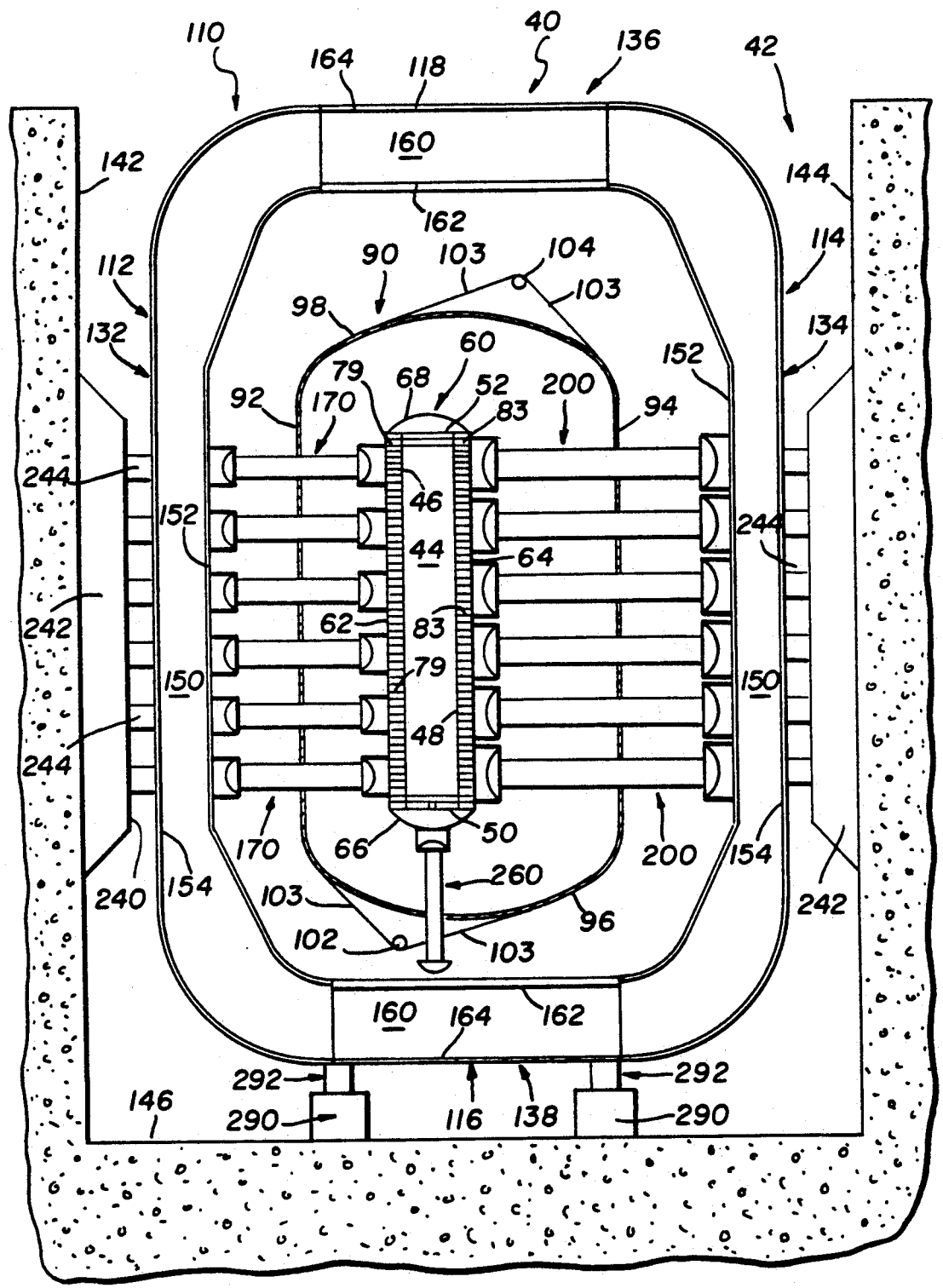
FIG. 8 is a sectional view taken along the line 8—8 of FIG. 7.

A generally cylindrical shaped nitrogen thermal shroud 90 completely surrounds coil containment vessel 60. The shroud 90 has a vertical radial inner wall 92, a vertical radial outer wall 94, a bottom 96 and a top 98 (FIG. 8). Liquefied nitrogen is fed by conduit 102 into tubes 103 attached to the surface of shroud 90 and nitrogen gas is removed therefrom by conduit 104. The shroud constitutes a heat sink, actively cooled with liquefied nitrogen, that surrounds the coil containment vessel 60. It substantially reduces the radiation heat load transferred from the vacuum vessel 110, which is at ambient temperature, to the coil containment vessel. The shroud, which can be made of sheet aluminum, can be suspended from vacuum vessel frames 130 by wire rope or rods made of metal or a composite insulating material. Suspending the shroud allows it to thermal cycle freely without harmful restraint. The shroud can be surrounded by multilayer thermal insulation for maximum effectiveness.

The generally cylindrical shaped vacuum vessel 110 surrounds and is spaced outward from the shroud 90. The vacuum vessel 110 has an inner radial wall 112, an outer radial wall 114, a floor or bottom 116 and a top or roof 118. The vacuum vessel inner wall 112 is spaced radially outward from the trench inner wall 142 and the vacuum vessel outer wall 114 is spaced radially inward from the trench outer wall 144. Additionally, the bottom or floor 116 of the vacuum vessel 40 is spaced upward from the bottom or floor 146 of trench 42 (FIG. 8).

Figure 2:
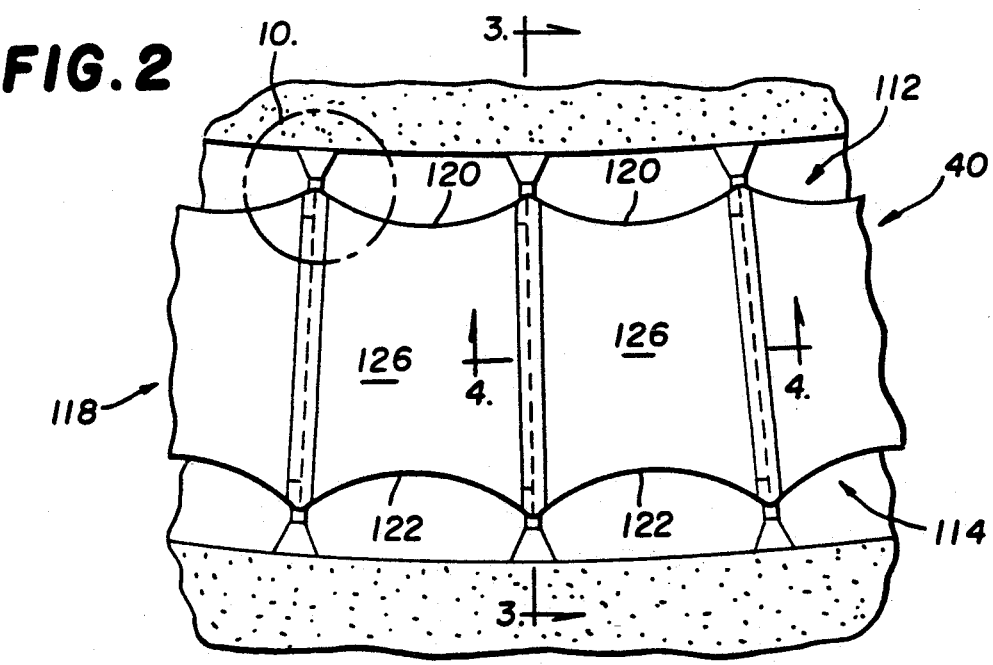
FIG. 2 is an enlarged more detailed plan view of the apparatus shown in FIG. 1.
Figure 4:
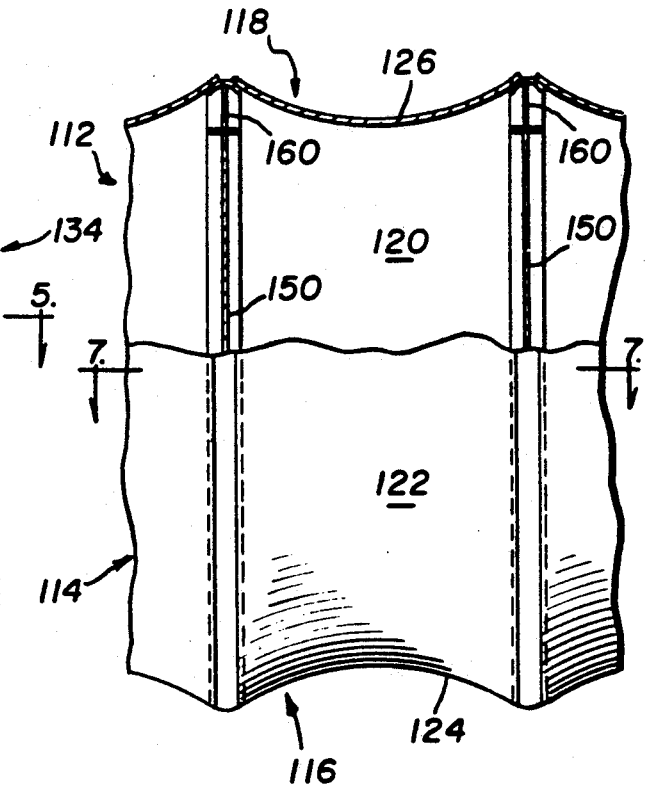
FIG. 4 is a partial vertical sectional view taken along the line 4—4 of FIG. 2.

The vacuum vessel 110 inner wall 112 is scalloped and is formed of curved shell sections 120. The vacuum vessel outer wall 114 is also scalloped and it is formed of curved shell sections 122. The vacuum vessel bottom 116 is also scalloped and it is formed of curved shell sections 124. Additionally, the vacuum vessel top 118 is also scalloped and it is also formed of curved shell sections 126 (FIGS. 2, 4 and 7).

Figure 3:
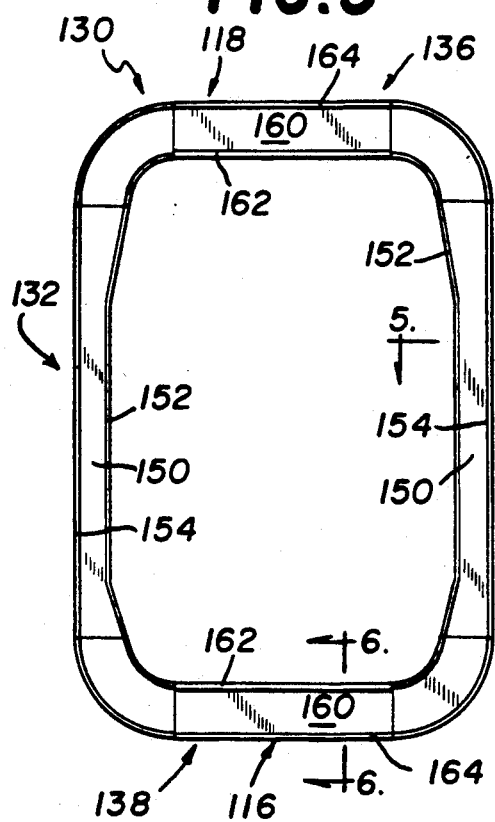
FIG. 3 is a vertical sectional view taken along the line 3—3 of FIG. 2.
Figure 5:
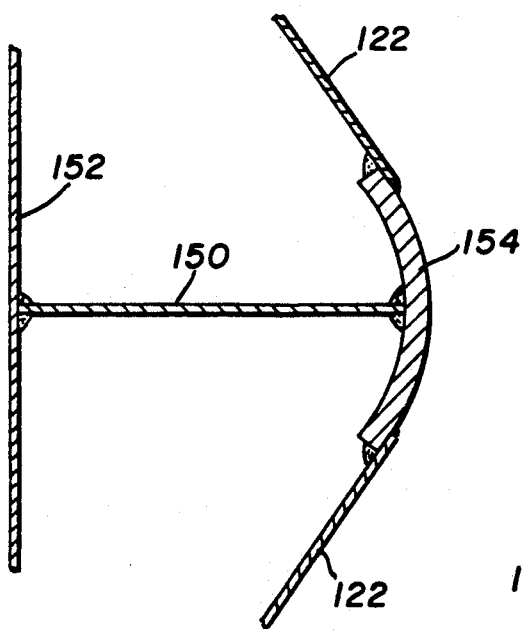
FIG. 5 is a sectional view taken along the line 5—5 of FIG. 3.
Figure 6:
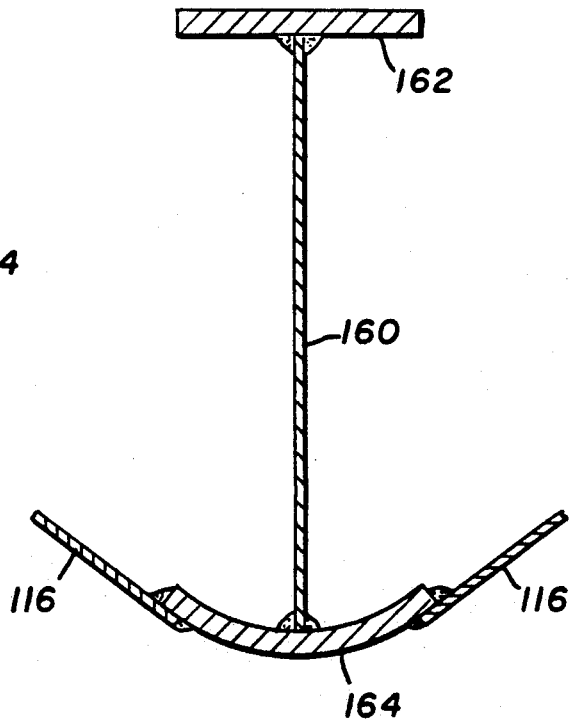
FIG. 6 is a sectional view taken along the line 6—6 of FIG. 3.

The vacuum vessel contains a plurality of circumferentially spaced apart vertically positioned and radially located internal frames 130. Each frame 130 has substantially identical opposing vertical side members 132,134, a horizontal top member 136 and a horizontal bottom member 138 (FIGS. 3 and 8). The vertical side members 132,134 have a central web 150, an internal flat flange 152 and an external curved flange 154 (FIG. 5). The substantially identical top and bottom members 136,138 have a central web 160, an internal flat flange 162 and an external curved flange 164 (FIG. 6). It should be understood that webs 150 and 160 lie in the same plane and are joined together to form a continuous ring-like web. The internal flanges 152,162 are also joined together to make a continuous band-like flange.

Additionally, the external curved flanges 154,164 are joined together to form an endless rim.

Adjacent edges of the outer curved shell plates 122 are joined to an outer curved flange 154 of outer member 134 (FIG. 7). Similarly, adjacent edges of the inner curved shell plates 120 are joined to an inner curved flange 154 of inner member 132 (FIG. 7). The adjacent edges of bottom curved shell plates 124 are joined to a curved flange 164 of bottom member 138 (FIGS. 3 and 6) and the adjacent edges of top curved shell plates 126 are similarly joined to a curved flange 164 of top or upper member 136 (FIGS. 3, 6, 7 and 9).

The described scalloped structure of the vacuum vessel 110 permits it to radially expand and contract with thermal changes of the coil 44 and coil containment vessel 60 as well as with changes in magnetic energy load.

Horizontal radial displacement of the superconducting magnetic energy storage apparatus due to thermal and magnetic loads is controlled, in part, by radial cold to warm inner struts 170 and radial cold to warm outer struts 200 (FIG. 8). The radial outer struts 200 will be subjected to higher loads than the radial cold to warm inner struts 170 so that the cold to warm outer struts 200 are made stronger and generally have a greater lateral diameter than the inner struts 170. In all other significant structural aspects the cold to warm inner 170 and cold to warm outer 200 struts are essentially the same.

A plurality of cold to warm inner struts 170 are positioned horizontally spaced apart one above the other in a vertical column in which the struts are substantially aligned in a radial vertical plane, and a plurality of such vertical columns of cold to warm inner struts 170 are horizontally spaced apart radially around the coil structure 44 (FIG. 7). Each vertical column of cold to warm inner struts 170 is positioned so that each strut radial inner end abuts with the inner side member 132 of frame 130 (FIGS. 7 and 8) while the strut radial outer ends abut with the strut interface plate 74. The struts 170 penetrate the inner wall 92 of shroud 90.

A plurality of cold to warm outer struts 200 are positioned horizontally spaced apart one above the other in a vertical column in which the struts are substantially aligned in a radial vertical plane, and a plurality of such vertical columns of cold to warm outer struts 200 are horizontally spaced apart radially around the coil structure 44 (FIG. 7). Each vertical column of cold to warm outer struts 200 is positioned so that each strut radial inner end abuts with the interface plate 76 and the outer end of each strut abuts with the outer side member 134 of frame 130 (FIGS. 7 and 8). The cold to warm outer struts 200 penetrate the outer wall 94 of shroud 90.

FIGS. 22 to 26 illustrate a preferred form of cold to warm inner struts 170 which can be essentially identical in structural features. The strut 170 has a radial inner end 172 with a ball means 174 which nests in a socket means 176 secured to vertical interface plate 74. The strut 170 radial outer end 178 has a ball means 180 which nests in a socket means 182 secured to vertical inner side member 132 of frame 130.

Figure 22:
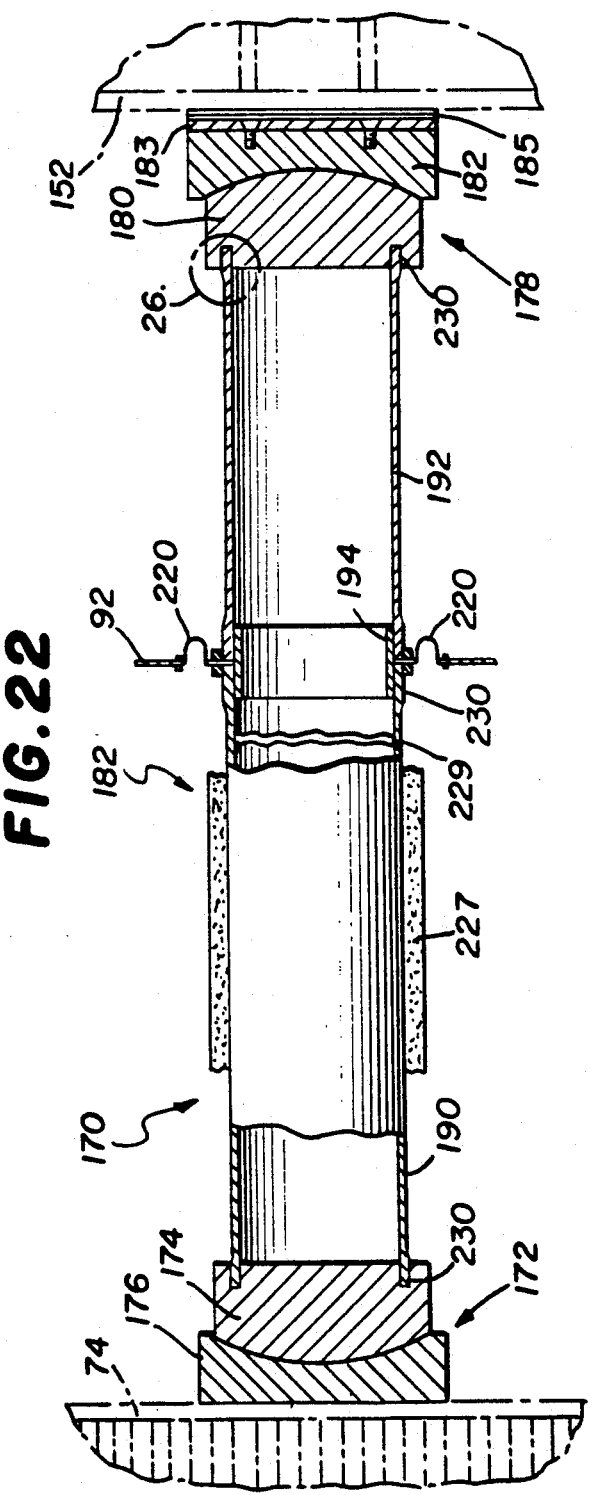
FIG. 22 is a partial sectional and partially broken away view of a cold to warm strut located between the coil containment vessel and vacuum vessel walls.
Figure 24:
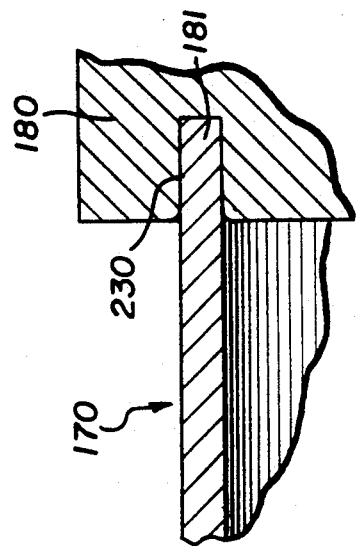
FIG. 24 is a sectional view of a cold to warm strut in which the strut shell has a uniform cylindrical shell thickness.

The socket means 182 at the warm end of strut 170 may be circular and can be attached to a carbon steel mounting plate 183 (FIG. 22). The mounting plate 183 and socket means 182 are then bolted to the inside flange 152 of the vacuum vessel frame 130. Oversized holes allow for accurate final positioning of the socket. Shims 185 are placed between the mounting plate 183 and flange 152 to make up the variation in distance between the coil containment vessel 60 and vacuum vessel 110 due to construction tolerances. The socket means 176 at the cold end is square or rectangular and is bolted to stiffeners 75 on inner interface plate 74 on the coil containment vessel 60. The square or rectangular socket 176 provides a uniform bearing surface behind the coil containment vessel 110 interface plate 74 to carry the compressive loads from the interface fingers to the struts.

The ball and socket means 180,182 can be made of aluminum. A thin layer of a material such as molybdenum disulfide may be bonded to the ball means 180 to provide a low-friction sliding surface between the ball and socket means.

The ball and socket means at the end of each strut 170 allows relative rotation of the strut ends. This allows the strut to accommodate differential thermal movements due to temperature gradients within the structural system without inducing high bending moments in the strut end connections and the struts itself.

Figure 23:
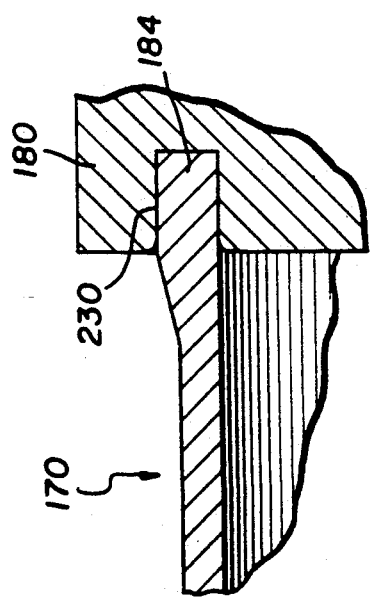
FIG. 23 is a sectional view of a cold to warm strut having a radially thicker end.

The tubular body 182 of cold to warm strut 170 can be a continuous one piece tubular member made of composite material, such as of glass or carbon fiber embedded in a suitable polymeric material. The struts are preferably fabricated of filament wound E-glass and epoxy. The ends 181 of the tubular body 182 can have the same wall thickness as the remainder of the tubular member (FIG. 24) or the tubular member can have thicker ends 184 for added strength (FIG. 23).

Figure 26:
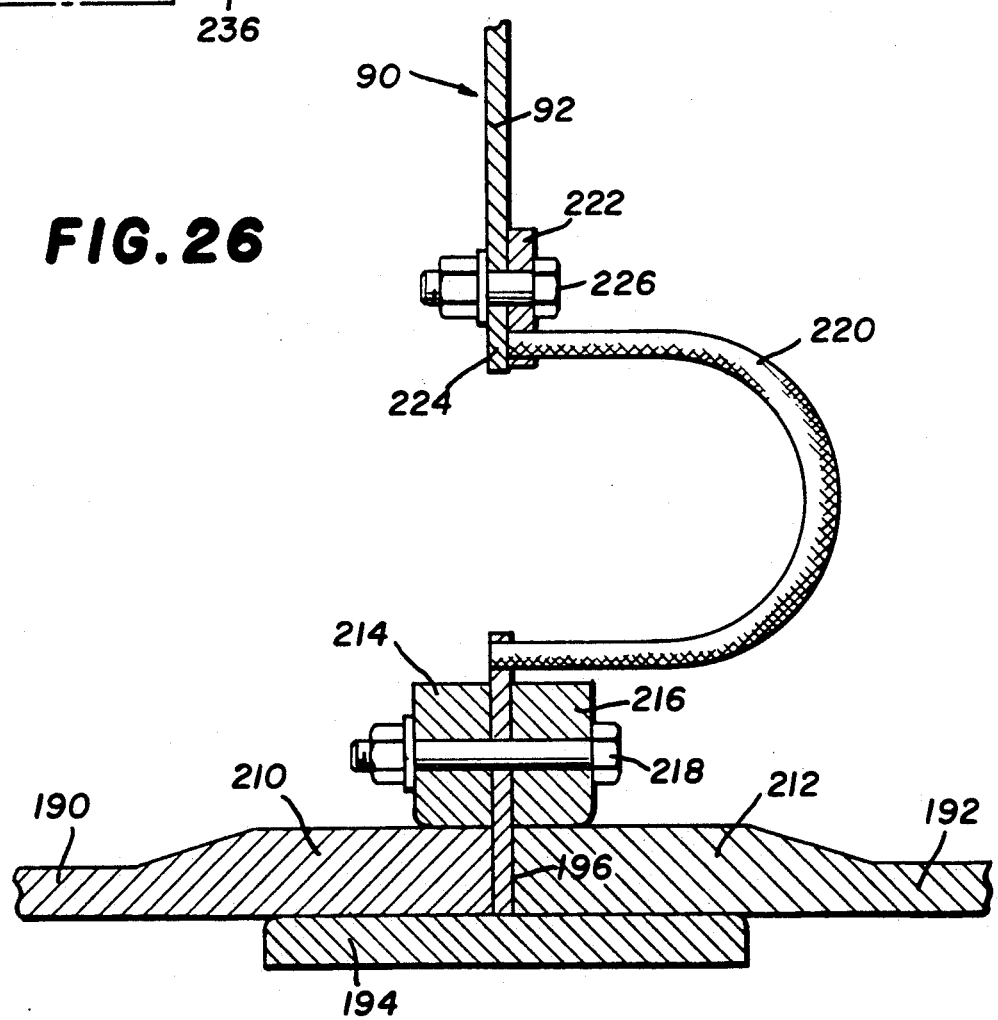
FIG. 26 is a sectional view of a cold to warm strut surrounded by a thermal intercept barrier.

In a preferred embodiment, the tubular body 182 can be made of two sections 190,192 located in axial alignment to each other and with the inner ends of each section positioned circumferentially around the outside of cylindrical metal ring 194 (FIGS. 22 and 26). A metal disc 196 having a circular hole is positioned around, and is joined to, ring 194. The thickened inner ends 210,212 of the respective tubular sections 190,192 abut the opposing sides of disc 196. Metal guide rings 214,216 are located on opposite sides of disc 196 and are connected together by bolts 218 (FIGS. 22 and 26). The inner edge of a plurality of tubular or cylindrical copper braided sheets or webs 220 are joined to disc 196 and the outer edge of the braided sheets 220 is joined to a metal plate 222, which can be made of copper (FIGS. 22 and 26). Plate 222 is secured to the circular edge 224, defined by a hole in the inner side wall 92 of shroud 90, by bolts 226. The described construction will be seen to constitute a cold to warm strut thermal intercept which interrupts and diverts heat flow from the vacuum vessel 40 through the struts to the coil containment vessel 44. It is also desirable to insulate the exterior of the cold to warm struts 170,200 with an insulating layer 227. The insulating layer may constitute a plurality of blankets placed around the strut in multilayer arrangement. Furthermore, an insulating disk 229 can be located in the struts 170,200 to further retard heat transfer (FIG. 22). The disk 229 may comprise multilayer insulation.

Each of the ball means 174,190 is provided with a circular axial groove 230 which receives the end of a cold to warm strut 170,200. A radial hole 232 (FIG. 25) communicates with groove 230 and provides a drain or vent through which air and excessive liquid adhesive can escape when the end of the strut is inserted into the groove and is bonded thereto.

Figure 25:
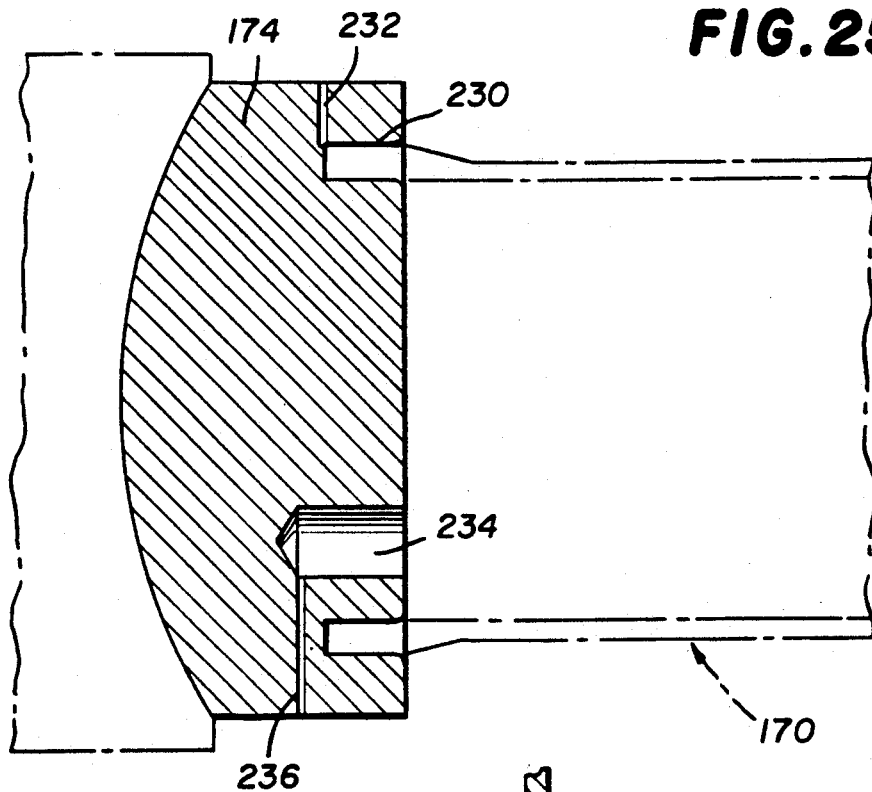
FIG. 25 is an enlarged sectional view of the ball and socket joint at the end of a cold to warm strut.

A further vent comprising holes 234,236 in communication with each other provide a flow path for air to flow out of the interior of the struts 170,200 when a vacuum is created inside of vacuum vessel 40 to thereby equalize the pressure on both sides of the strut walls (FIG. 25).

A plurality of vertical bearing plates 240 are mounted on vertical concrete spaced apart ribs 242 on the trench inner wall 142. Each rib and bearing plate 240 is located radially opposite the ends of struts 170. A bearing plate assembly 244 is mounted on a curved flange 154 radially opposite each strut 170. A gap is provided between bearing plate 240 and the bearing plate 243 of each bearing plate assembly 244 and the width of the gap is adjusted at the end of construction to meet predetermined clearance dimensions. The sides of each bearing plate assembly 244 are located between laminated elastomeric bearing pads 246 which are secured to flanges 248 connected to bearing plate 240 (FIG. 10). The bearing plates serve to transfer the inward compressive loads due to the external pressure acting on the vacuum vessel 110 as well as the coil cooldown which tends to contract the coil.

The trench outer wall 144 is also provided with a support system like that described above and illustrated by FIG. 10, it being understood that the bearing plates 240,243 are located opposite the outer ends of struts 200 when so positioned by the outer wall 144. However, the bearing plates along the outside of the structure transfer the outward compressive magnetic loads produced by the superconducting coil to the trench outer wall. The bearing plate structure cannot transmit tensile loads so it prevents the cold to warm struts 170,200 from going into tension. For load conditions that would otherwise load the struts in tension the bearing plates separate some small amount instead of inducing tension. This is illustrated by FIGS. 14 and 15.

Figure 14:
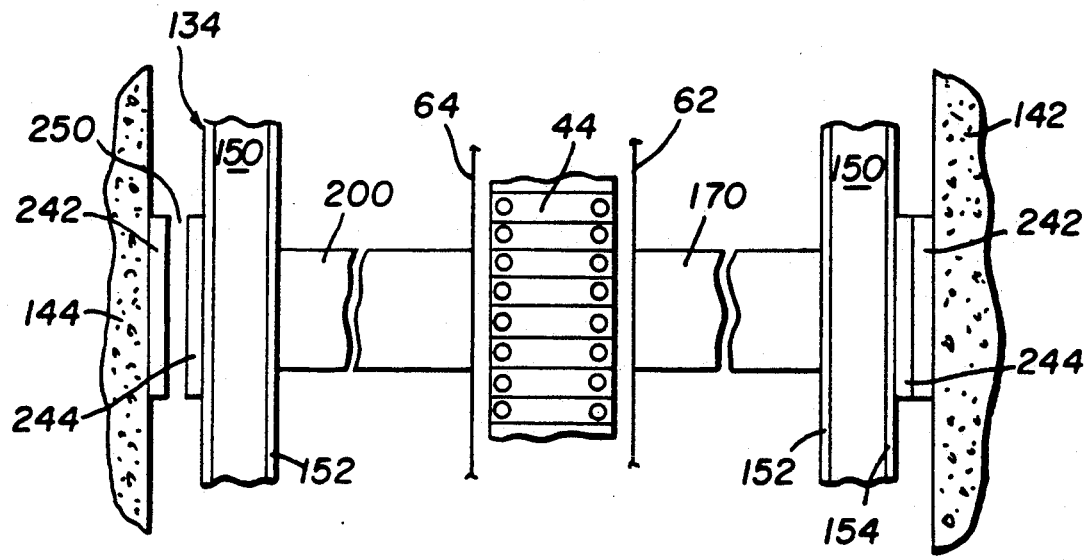
FIG. 14 is a vertical or elevational schematic view illustrating how the energy storage apparatus is displaced radially inwards, when cooled by liquefied helium in the coil containment vessel, and applies a compressive load to the tunnel or trench radial inner wall.
Figure 15:
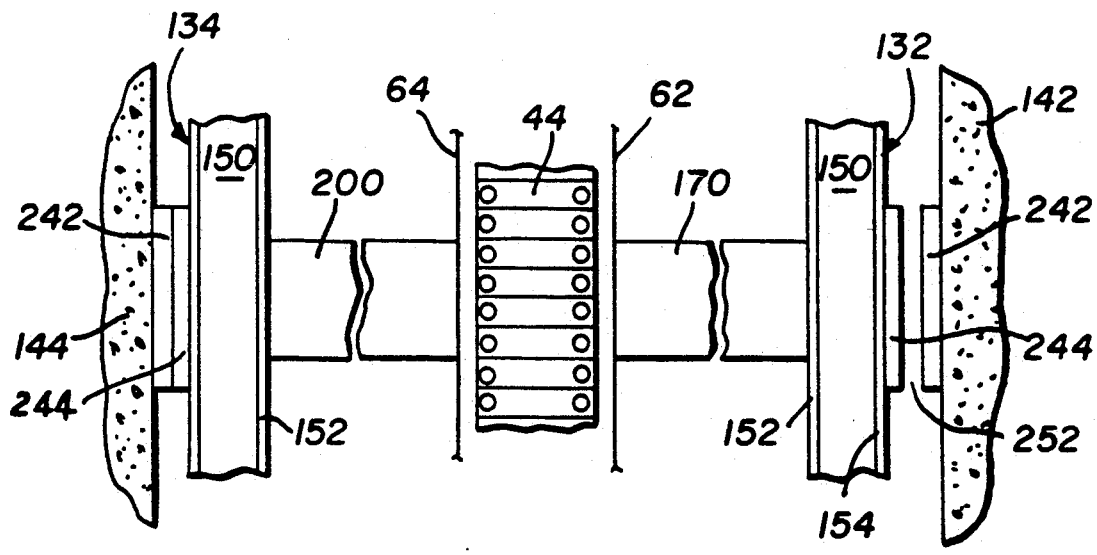
FIG. 15 is a vertical or elevational schematic view illustrating how the energy storage apparatus is displaced radially outwards, when fully charged with electromagnetic energy, and it applies a compressive load to the tunnel or trench radial outer wall.

With reference to FIG. 14, during initial start-up of the SMES, a vacuum pressure of one atmosphere is pulled on the vacuum vessel 60 so that all cold to warm struts 170,200 are loaded in compression and there is a net inward radial load on the structure. After the required vacuum level is reached, cooldown of the coil proceeds which produces an additional net inward radial compressive load on the cold to warm struts 170 on the radial inner side of the coil and the bearing plates on the radial inner side of the coil 44. At this time, there is a small gap 250 between the bearing plates on the radial outer side of the apparatus mainly due to strain in the cold to warm struts 170 and strain of the foundation 142 and earth on the inside of the apparatus.

Once it is cooled to its operating temperature, the superconducting coil 44 is electrically charged. The charged coil produces a large radial outward magnetic load which is partially offset by the vacuum and cooldown loads. The magnetic load forces the coil 44 to move radially outward, it reduces the compressive load acting on the inner cold to warm struts 170, increases the compressive load acting on the outer cold to warm struts 200, and produces a radial compressive load on the bearing plates on the radial outer side of the apparatus. At this point, there is a small gap 252 between the bearing plates on the radial outward side of the apparatus mainly due to strain in the cold to warm struts 200 and strain of the foundation 144 and soil on the radial outer side of the apparatus (FIG. 15). Since external pressure on the vacuum vessel is always present during operation due to the internal vacuum, the cold to warm struts 170,200 are never subjected to tensile loads.

FIGS. 8, 9 and 11 illustrate the vertical support system for the coil containment vessel 60. A vertical cold to warm strut 260 is supported at its lower end on the top of the internal flange 162 of each of the bottom members 138 of frames 130. The upper end of each cold to warm strut 260 supports the bottom 66 of the coil containment vessel 60. Each strut 260 can have essentially the same structure as the cold to warm struts 170,200 previously described. The struts 260 can have a single piece continuous tubular body or they can be fabricated of two or more tubular sections connected together. Also, the struts 260 can include a thermal intercept as already described above regarding struts 170 or the struts 260 can be used without such a thermal intercept if considered desirable.

The cold to warm struts 260 may be suitably braced so that they remain essentially vertical at all times during operation of the SMES, when it is being put in operation and when it is out of operation for repair and servicing. One suitable bracing system is illustrated in FIG. 9. One slanted brace 268 can be joined at an upper end 270 to the bottom 66 of the coil containment vessel 60 and the brace lower end 272 can be joined to the web 160 of a bottom member 138 of a frame 130 supporting an adjacent cold to warm strut 260. A turnbuckle 274 can be incorporated in brace 268 for adjustment of the brace. A second slanted brace 278 can have an upper end 280 joined to the bottom 66 of coil containment vessel 60 and the brace lower end 282 can be joined to the web 160 of a bottom member 138 of a frame 130 supporting an adjacent cold to warm strut 260. A turnbuckle 284 can be incorporated in brace 278 for adjustment of the brace. While each brace can be made of stainless steel rod material, it is advisable for each brace to include a length of composite strap, such as a strap made of filament-wound S-glass/epoxy material combining high strength and low thermal conductivity which helps minimize heat transfer from the warm end to the cold end of the brace. Also, a thermal intercept such as described above can be incorporated near where the brace penetrates the nitrogen shroud. The two braces 268,278 are arranged in a bay space 280 between two adjacent struts 260. Every other bay space may be provided with a pair of crisscross braces 268,278 so as to stabilize the coil containment vessel 60 against movement to the right and left in a peripheral or circumferential direction.

A support block 290 (FIGS. 8, 9 and 11) is mounted on the trench bottom or floor 146 and mounted on the top of block 290 is a bottom external support 292 having a bottom plate 294 and spaced apart guide walls 296,298. A bottom elastomeric pad 300 rests on bottom plate 294 and a spaced apart vertical elastomeric pad 302 abuts each of the walls 296,298. A bearing assembly 310, having a bottom bearing plate 312, is joined to the outer surface of curved plate 164 at the bottom of each frame 130. The lower end of the bearing assembly 310 fits between the two spaced apart vertical elastomeric pads 302 and the bearing plate 312 rests on the top of elastomeric pad 300. The described support system permits movement to the left and right as well as vertical, thereby accommodating movement of the vacuum vessel through all cycles to which it is put.

FIGS. 16 to 21 illustrate diagrammatically how the loads and components of the SMES apparatus described above are integrated.

With reference to FIG. 16, when the apparatus is constructed a small gap 330 is provided between the vacuum vessel radial inner wall support structure and the adjacent trench inner wall 142 support structure. Similarly, a small gap 340 is provided between the vacuum vessel 110 radial outer wall support structure and the adjacent trench outer wall 144 support structure. The gaps 330,340 may be no more than 0.25 inch. Also, the cold to warm struts 170,200 can be shimmed to achieve a desired initial load between the vacuum vessel 110 and the coil containment vessel 60.

By setting variable gaps 330,340 between the inner and outer walls 142,144 of the vacuum vessel radial inner wall support structure in the warm condition or in a cooldown condition the structural system may be tuned. Varying the gaps will alter the load transfer between the foundation, vacuum vessel, cold to warm struts, coil containment vessel 60 and coil 44. Furthermore, the described system allows for easy adjustment for long term creep of the surrounding foundation by use of shim plates. With the coil discharged, shims may be inserted between the outer wall 144 and vacuum vessel radial outer wall support or restraining structure. Long term creep of the foundation on the radial inner side of the coil is not a likely problem since the inner radial loads are much less than the outer radial loads and, also, the duration of the inner radial loads is short term.

When construction of the SMES apparatus is completed as shown in FIG. 16, the cold to warm struts 170,200 are horizontal and the struts 260 are vertical.

To put the SMES apparatus in operation a vacuum is created in vacuum vessel 110 thereby increasing the exterior pressure on this vessel. This causes the frames 130 to deflect inwardly and the cold to warm struts 170,200 to be compressed. The apparatus contracts circumferentially and moves radially inwardly, closing gap 330 and loading struts 170 and the trench wall 142 (FIG. 17). This described movement of the apparatus causes the vertical supports 260 to tilt or slant as shown in FIG. 17.

The effect of cooldown is illustrated by FIG. 18. When the coil containment vessel 60 is loaded with liquefied helium, the coil 44 and coil containment vessel 60 contract and compress the radial inner supports between the trench wall 142 and the wall of the coil containment vessel 60. The cold to warm struts 170,200 remain compressed by the vacuum. However, the cold to warm struts 170,200 deflect downwardly as the coil 44 contracts vertically and, to some extent, because of the tilting of vertical cold to warm struts 260. The previously created gap 250 remains open.

As a magnetic load develops, such as a magnetic load less than 10% of the magnetic load capacity of the coil, the radial inner loads due to cooldown and vacuum pressure are overcome and the load path moves to the radial outer support system along the radial outer trench wall 144. At about a 10% magnetic load the SMES is at about neutral with respect to radial horizontal compressive loads (FIG. 22). Gap 252 forms on the radial inner side of the SMES along the trench wall support system while the previous radial outer gap 250 remains open. The vertical cold to warm struts 260 are again vertical at this time (FIG. 19).

Above about a 10% magnetic load the radial outer support system resists the load and the radial inner gap 252 remains open (FIG. 20). However, the vertical cold to warm struts 260 become tilted or slanted from vertical in a direction opposite to that shown in FIGS. 17 and 18.

At such time as it becomes necessary to dump the liquefied helium, the radial outer load initially increases as the magnetic, thermal and pressure loads increase. This load quickly decreases as the magnetic load falls so that eventually the gap 252 along the radial inner wall SMES support system is eliminated (FIG. 21).

When the restraining structure is an open top trench it may be desirable to tilt the walls of the vacuum vessel 110, the coil containment vessel 60 and the coil structure 44 slightly outward from vertical at the top. This slight amount of tilt changes the electromagnetic field produced by the coil and changes the radial pressure distribution. In this way the load applied to the upper portion of the trench outer wall is reduced and this could be desirable since the compressive load which the trench wall is able to resist is lower in the wall upper portion than in the wall lower portion.

Major advantages of the described structural support system include the following:

A. No soil or rock tension anchors are required. The critical loadings are transmitted to the foundation through the bearing plates in compression.

B. The cold to warm struts and end connections are designed only for compressive loads; they do not need to be designed for tensile loads.

C. The required flexibility of the vacuum vessel is much less for this containment system than for an unrestrained coil system. However, flexibility is desired for both the vacuum vessel and coil containment vessel, since flexible vessels will allow a higher percentage of the vacuum, cooldown, and magnetic loads to be carried by the foundation and will result in a lower percentage of the loads being resisted by the vessels.

D. The structural support system of this invention does not require expensive external adjustable struts as is required for the initially unrestrained coil system.

E. The radial movements that the vertical support system must accommodate are much less for the structural support system of this invention than for the initially unrestrained coil system.

F. The subject invention allows for easy adjustment for long term creep of the surrounding foundation by using shim plates. With the coil discharged, shims may be inserted between the outside bearing plates. The amount of creep can be easily determined by measuring the gap between the outside bearing plates with the coil discharged. Long term creep of the foundation on the inside of the coil is not expected to be a problem since the inward radial loads are much less than the outward radial loads, and the duration of the inward radial loads is short term.

G. The response of the structural system may be "tuned" by setting variable gaps between the inside and outside bearing plates with the coil in the warm condition or the cooldown condition. Varying the gaps will alter the load transfer between the foundation, vacuum vessel, cold to warm struts, coil containment vessel and coil.

H. The total cold to warm strut area of contact with the vacuum vessel warm wall required for this concept is the same as for the initially unrestrained coil concept, since this concept simply takes area from the outside struts and shifts it to the inside struts.

The foregoing detailed description has been given for clearness of understanding only, and no unnecessary limitations should be understood therefrom, as modifications will be obvious to those skilled in the art.

What is claimed is:

1. A superconducting magnetic energy storage apparatus comprising:

a generally cylindrical shaped superconducting coil structure;

the coil structure having an inner circumferential face, an outer circumferential face and a bottom face;

a generally cylindrical shaped coil containment vessel, surrounding and enclosing the coil structure, and adapted to hold a liquid;

the coil containment vessel having an inner circumferential wall spaced inward of the coil structure inner circumferential face;

the coil containment vessel having an outer circumferential wall, spaced outward of the coil structure outer circumferential face;

the coil containment vessel having a bottom wall spaced downward of the coil structure bottom face;

a generally cylindrical shaped vacuum vessel surrounding and enclosing the coil containment vessel;

the vacuum vessel being located in a restraining structure having an inner circumferential wall, an outer circumferential wall and a floor;

the vacuum vessel having an outer circumferential wall spaced inward of the restraining structure outer circumferential wall;

the vacuum vessel having an inward circumferential wall spaced radially outward of the restraining structure inner circumferential wall;

the vacuum vessel having a bottom spaced downward of the coil containment vessel bottom wall;

coil support means supporting the coil structure bottom face above the coil containment vessel bottom wall;

substantially horizontal compression member means between the coil structure outer face and the coil containment vessel outer wall, and substantially horizontal compression member means between the coil structure inner face and the coil containment vessel inner wall;

substantially horizontal cold to warm compression member means between the coil containment vessel outer wall and the vacuum vessel outer wall and substantially horizontal compression member means between the coil containment vessel inner wall and the vacuum vessel inner wall;

compression bearing means, on the outside of the vacuum vessel outer wall, aligned with compression bearing means on the restraining structure outer wall;

compression bearing means, on the outside of the vacuum vessel inner wall, aligned with compression bearing means on the restraining structure inner wall;

the compression members being dimensioned such that when the coil containment vessel is loaded with a liquid cryogen, the vacuum vessel is evacuated to an operable system vacuum and the coil structure contains an amount of electrical energy between a minimal amount and a substantial load, an outwardly directed radial force is exerted by the resulting magnetic energy the compression bearing means on the outside of the inner wall of the vacuum vessel is spaced radial outwards from, and out of contact with, the compression bearing means on the restraining structure inner wall and the compression bearing means on the outside of the outer wall of the vacuum vessel is spaced radial inwards form, and out of contact with, the compression bearing means on the restraining structure outer wall.

2. A superconducting magnetic energy storage apparatus according to claim 1 in which:

when the coil structure has a minimal electrical energy load of up to about 10% of the electrical energy storage capacity of the coil structure and the compression bearing means on the outside of the inner wall of the vacuum vessel contacts the compression bearing means on the restraining structure inner wall, a radial inwardly directed compressive force is exerted by the coil causing the compression bearing means on the outside of the inner wall of the vacuum vessel to contact the compression bearing means on, and transfer the radial inward directed compressive load to the restraining structure inner wall.

3. A superconducting magnetic energy storage apparatus according to claim 1 in which:

when the coil structure is substantially loaded with electrical energy and the compression bearing means on the outside of the outer wall of the vacuum vessel contacts the compression bearing means on the restraining structure outer wall, the compression bearing means on the outside of the inner wall of the vacuum vessel is spaced radial outwards from, and out of contact with, the compression bearing means on the restraining structure inner wall.

4. A superconducting magnetic energy storage apparatus according to claim 1 in which:

the compression member means is dimensioned such that when the coil containment vessel is loaded with a liquid cryogen, the vacuum vessel is evacuated to an operable system vacuum and the coil structure is essentially void of electrical energy, a radial inwardly directed compressive force is exerted causing the compression bearing means on the outside of the inner wall of the vacuum vessel to contact the compression bearing means on, and transfer the radial inwardly directed compressive load to, the restraining structure inner wall.

5. A superconducting magnetic energy storage apparatus according to claim 4 in which:

when the coil structure is essentially void of electric energy the compression bearing means on the outside of the outer wall of the vacuum vessel is spaced from, and out of contact with, the compression bearing means on the restraining structure outer wall.

6. A superconducting, magnetic energy storage apparatus according to claim 1 in which:

the substantially horizontal compression member means between the coil structure outer face and the coil containment vessel outer wall, and between the coil structure inner face and the coil containment vessel inner wall, are spaced apart flexible fingers with the ends of the fingers in contact with one of the coil structure and the coil containment vessel.

7. A superconducting magnetic energy storage apparatus according to claim 6 in which:

the flexible fingers are attached to the coil containment vessel.

8. A superconducting magnetic energy storage apparatus according to claim 6 in which:

a plurality of vertical columns of fingers are positioned along each of the circumferential inner and outer walls of the coil containment vessel and a plurality of vertically spaced apart fingers are in each column.

9. A superconducting magnetic energy storage apparatus according to claim 8 in which:
the fingers are flat elongated members horizontally positioned and fabricated of composite nonelectrically conducting material having a low heat conducting capacity.

10. A superconducting magnetic energy storage apparatus according to claim 9 in which:
the flexible fingers are attached to the coil containment vessel.

11. A superconducting magnetic energy storage apparatus according to claim 1 in which:
the substantially horizontal compression member means between the coil containment vessel outer wall and the vacuum vessel outer wall, and between the coil containment vessel inner wall and the vacuum vessel inner wall, are struts.

12. A superconducting magnetic energy storage apparatus according to claim 11 in which:
each strut has two opposing ends and one strut end is operatively associated with a coil containment vessel wall so that the strut can accommodate movement and deformation of said vessel wall, and the other end of the strut is operatively associated with a vacuum vessel wall so that the strut can accommodate movement and deformation of the vacuum vessel wall.

13. A superconducting magnetic energy storage apparatus according to claim 11 in which:
each strut has opposing ends and one strut end is operatively joined through a ball and socket type joint to a coil containment vessel wall and the other end of the strut is joined through a ball and socket type joint to a vacuum vessel wall.

14. A superconducting magnetic energy storage apparatus according to claim 11 in which:
horizontally spaced apart vertical columns of horizontal struts are positioned along the inner and outer walls of the vacuum vessel and a plurality of vertically spaced apart horizontal struts are in each column; and
each strut has opposing ends and one strut end is operatively associated with a coil containment vessel wall so that the strut can accommodate movement and deformation of the coil containment vessel wall and the other end of the strut is operatively associated with a vacuum vessel wall so that the strut can accommodate movement and deformation of said vacuum vessel wall.

15. A superconducting magnetic energy storage apparatus according to claim 11 in which:
horizontally spaced apart vertical columns of horizontal struts ate positioned along the inner and outer walls of the vacuum vessel and a plurality of vertically spaced apart horizontal struts are in each column; and
each strut has opposing ends and one strut end is operatively joined through a ball and socket type joint to a coil containment vessel wall and the other end of the strut is joined through a ball and socket type joint to a vacuum vessel wall.

16. A superconducting magnetic energy storage apparatus according to claim 11 in which:
each strut is tubular and is fabricated of composite non-electrically conducting material having a low heat conducting capacity.

17. A superconducting magnetic energy storage apparatus according to claim 15 in which:
horizontally spaced apart vertical columns of fingers are positioned along each of the circumferential inner and outer walls of the coil containment vessel and a plurality of vertically spaced apart fingers are in each column; and
to a substantial extent each column of fingers is radially aligned with a column of tubular struts so as to more directly transfer compressive loads through the coil containment vessel walls.

18. A superconducting magnetic energy storage apparatus according to claim 17 in which:
the compression bearing means on the outside of the vacuum vessel outer wall and the compression bearing means on the restraining structure outer wall are arranged in horizontally spaced apart vertical columns aligned with the columns of horizontal struts along the vacuum vessel outer wall; and
the compression bearing means on the outside of the vacuum vessel inner wall and the compression bearing means on the restraining means inner wall are arranged in horizontally spaced apart vertical columns aligned with the columns of horizontal struts along the vacuum vessel outer wall.

19. A superconducting magnetic energy storage apparatus according to claim 1 in which:
a generally cylindrical shaped thermal shroud is located between the coil containment vessel and the vacuum vessel; and
the shroud surrounds the coil containment vessel and the vacuum vessel surrounds the shroud.

20. A superconducting magnetic energy storage apparatus according to claim 19 in which:
the shroud includes tubes to which a fluid coolant can be fed to cool the shroud.

21. A superconducting magnetic energy storage apparatus according to claim 11 in which:
a generally cylindrical shaped thermal shroud is located between the coil containment vessel and the vacuum vessel;
the struts penetrate the shroud; and
thermal intercept means communicates with the thermal shroud and with many of the struts to extract heat and decrease the amount of heat leak to the coil containment vessel.

22. A superconducting magnetic energy storage apparatus according to claim 21 in which:
the thermal intercept means includes a metal ring around in contact with a strut and a loop of a metal braided sheet extends from and is joined to the metal ring and the thermal shroud.

23. A superconducting magnetic energy storage apparatus according to claim 22 in which:
many of the tubular struts comprise a plurality of sections, the metal ring is laterally positioned between adjacent ends of the two sections and a sleeve telescopes inside the adjacent ends of the two tubular sections and inside of the ring.

24. A superconducting magnetic energy storage apparatus according to claim 23 in which:
a collar is located on each axial side of and is to the metal ring, with each collar spaced radially outward of the sleeve thereby defining opposing axially positioned circular grooves in which fit the adjacent ends of the tubular struts.

25. A superconducting magnetic energy storage apparatus according to claim 21 in which:
a multilayer thermal insulation plug is radially positioned inside many of the struts adjacent the thermal intercept means.

26. A superconducting magnetic energy storage apparatus according to claim 16 in which:
each tubular strut has a vent hole for evacuating the strut interior when the vacuum vessel is evacuated.

27. A superconducting magnetic energy storage apparatus according to claim 16 in which:
the tubular struts have radially thicker wall portions at the ends than axially inwardly from the ends.

28. A superconducting magnetic energy storage apparatus according to claim 1 in which:
spaced apart vertical compression members extend from the coil containment vessel bottom to the vacuum bottom, the compression members accommodate relative lateral and vertical displacement between the coil containment vessel and the vacuum vessel; and
the bottom of the vacuum vessel is supported by external support means located on the restraining means floor, the external support means accommodating relative lateral displacement between the coil containment vessel and the vacuum vessel.

29. A superconducting magnetic energy storage apparatus according to claim 28 in which:
the spaced apart vertical compression members include substantially vertical struts.

30. A superconducting magnetic energy storage apparatus according to claim 29 in which:
each substantially vertical strut has two opposing ends and one strut end is operatively associated with the coil containment vessel bottom so that the strut can accommodate movement and deformation of the coil containment vessel bottom, and the other end of the vertical strut is operatively associated with the vacuum vessel bottom so that the strut can accommodate movement and deformation of the vacuum vessel bottom.

31. A superconducting magnetic energy storage apparatus according to claim 29 in which:
each vertical strut has opposing ends and one strut end is operatively joined through a ball and socket type joint to the coil containment vessel bottom and the other end of the strut is joined through a ball and socket , type joint to the vacuum vessel bottom.

32. A superconducting magnetic energy storage apparatus according to claim 30 in which:
each vertical strut is tubular and is fabricated of composite non-electrically conducting material having a low heat conducting capacity.

33. A superconducting magnetic energy storage apparatus according to claim 29 in which:
a generally cylindrical shaped thermal shroud is located between the coil containment vessel and the vacuum vessel; and
the shroud surrounds the coil containment vessel and the vacuum vessel surrounds the shroud.

34. A superconducting magnetic energy storage apparatus according to claim 33 in which:
the vertical struts penetrate the shroud; and thermal intercept means communicates with the thermal shroud and with many of the vertical struts to extract heat and decrease the amount of heat leak to the coil containment vessel.

35. A superconducting magnetic energy storage apparatus according to claim 34 in which:
the vertical struts are tubular; and
the thermal intercept means includes a metal ring around in contact with a vertical strut and a loop of a metal braided sheet extends from and is joined to the metal ring and the thermal shroud.

36. A superconducting magnetic energy storage apparatus according to claim 35 in which:
many of the vertical struts comprise two sections, the metal ring is laterally positioned between adjacent ends of the two sections and a sleeve telescopes inside the adjacent ends of the two tubular sections and inside of the ring.

37. A superconducting magnetic energy storage apparatus according to claim 36 in which:
a collar is located on each axial side of and is joined to the metal ring, with each collar spaced radially outward of the sleeve thereby defining opposing axially positioned circular grooves in which fit the adjacent ends of the tubular struts.

38. A superconducting magnetic energy storage apparatus according to claim 28 in which:
the external support means includes a base on the restraining means floor, a resilient block on the top of the base, and a leg having a lower end bearing on the resilient block and an upper end joined to the vacuum vessel bottom.

39. A superconducting magnetic energy storage apparatus according to claim 1 in which:
the coil structure has a ripple profile in plan view;
the coil containment vessel has scalloped inner and outer walls formed of curved shell sections joined together by vertical joints;
the vacuum vessel has scalloped inner and outer walls formed of curved shell sections joined together by vertical joints; and
the vacuum vessel has an internal vertical frame at each vertical joint where two shell sections are joined together, with the vertical frame having an inner vertical side member adjoining the vacuum vessel inner wall, an outer vertical side member adjoining the vacuum vessel outer wall, a bottom horizontal member adjoining the vacuum vessel bottom and a top horizontal member adjoining the vacuum vessel top.

40. A method of stabilizing and supporting a superconducting electrical energy storage apparatus which includes a cylindrical coil containment vessel enclosing a coil structure and adapted to hold a liquid; and a cylindrical vacuum vessel enclosing the coil containment vessel and located in a restraining structure having inner and outer circumferential walls and a floor; the method comprising:
positioning horizontal compression member means between (1) the coil structure and the coil containment vessel and (2) between the coil containment vessel and the vacuum vessel;
positioning compression bearing means between the vacuum vessel and the restraining structure inner and outer walls;
positioning vertical support member means (1) between the coil bottom and the coil containment vessel bottom and (2) between the coil containment vessel bottom and the vacuum vessel bottom;

positioning external support means between the vacuum vessel bottom an the restraining structure floor;

dimensioning the horizontal compression member means (1) and (2) such that when the coil containment vessel is loaded with a liquid cryogen, the vacuum vessel is evacuated to an operable system vacuum and the coil structure contains an amount of electrical energy between a minimal amount and a substantial load an outwardly directed radial force is exerted by the resulting magnetic energy the compression bearing means on the outside of the inner wall of the vacuum vessel is spaced radial outwards from, and out of contact with, the compression bearing means on the restraining structure inner wall and the compression bearing means on the outside of the outer wall of the vacuum vessel is spaced radial inwards from, and out of contact with, the compression bearing means on the restraining structure outer wall; and whereby the structural integrity of the apparatus is maintained when subjected to changing loads developed and applied to the apparatus by different thermal and magnetic energy conditions.

41. A method according to claim 40 including:
positioning the horizontal compression member means (1) and (2) in substantial horizontal alignment.

42. A method according to claim 41 including:
positioning the vertical support member means (1) and (2) in substantial vertical alignment.

43. A method according to claim 40 including:
dimensioning the horizontal compression member means (1) and (2) such that when the coil containment vessel is loaded with a liquid cryogen, the vacuum vessel is evacuated to an operable system vacuum and the coil structure is substantially loaded with electrical energy, the outwardly directed compressive force exerted by the resulting magnetic energy causes the compression bearing means on the outside of an outer wall of the vacuum vessel to contact, and transfer the compressive load to, the compression bearing means on the restraining structure outer wall.

44. A method according to claim 40 in which:
when the coil structure has a minimal electrical energy load of up to about 10% of the electrical energy storage capacity of the coil structure and the compression bearing means on the outside of an outer wall of the vacuum vessel contacts the compression bearing means on the restraining structure outer wall, an inwardly directed compressive force is exerted by the coil causing the compression bearing means on the outside of an inner wall of the vacuum vessel to contact the compression bearing means on, and transfer the inward directed compressive load to, the restraining structure inner wall.

45. A method according to claim 40 in which:
when the coil structure is substantially loaded with electrical energy and the compression bearing means on the outside of an outer wall of the vacuum vessel contacts the compression bearing means on the restraining structure outer wall, the compression bearing means on the outside of an inner wall of the vacuum vessel is spaced outwards from, and out of contact with, the compression bearing means on the restraining structure inner wall.

46. A method according to claim 40 including:
dimensioning the horizontal compression member means (1) and (2) such that when the coil containment vessel is loaded with a liquid cryogen, the vacuum vessel is evacuated to an operable system vacuum and the coil structure is essentially void of electrical energy, an inwardly directed compressive force is exerted causing the compression bearing means on the outside of an inner wall of the vacuum vessel to contact the compression bearing means on, and transfer the inwardly directed compressive load to a restraining structure inner wall.

47. A method according to claim 40 in which:
when the coil structure is essentially void of electric energy the compression bearing means on the outside of an outer wall of the vacuum vessel is spaced from, and out of contact with, the compression bearing means on the restraining structure outer wall.

48. A method according to claim 40 in which:
the substantially horizontal compression member means between the coil structure and a coil containment vessel outer wall are spaced apart flexible fingers.

49. A method according to claim 40 in which:
the substantially horizontal compression member means between an outer wall of the coil containment vessel and an outer wall of the vacuum vessel, and between an inner wall of the coil containment vessel and an inner wall of the vacuum vessel, are struts.

50. A method according to claim 49 in which:
each strut has two opposing ends;
positioning one strut end so as to be operatively associated with a coil containment vessel wall so that the strut can accommodate movement and deformation of said vessel wall; and
positioning the other end of the strut so as to be operatively associated with a vacuum vessel wall so that the strut can accommodate movement and deformation of the vacuum vessel wall.

51. A method according to claim 50 in which:
each strut has opposing ends and one strut end is operatively joined through a ball and socket type joint to a coil containment vessel wall and the other end of the strut is joined through a ball and socket type joint to a vacuum vessel wall.

52. A method according to claim 49 in which:
the vacuum vessel has inner and outer walls;
positioning horizontally spaced apart vertical columns of horizontal struts along the inner and outer walls of the vacuum vessel, with a plurality of vertically spaced apart horizontal struts in each column;
each strut having two opposing ends; and
operatively joining one strut end to a coil containment vessel wall so that the strut can accommodate movement and deformation of the coil containment vessel wall and operatively joining the other end of the strut to a vacuum vessel wall so that the strut can accommodate movement and deformation of said vacuum vessel wall.

53. A method according to claim 49 in which:
the vacuum has inner and outer walls;
positioning horizontally spaced apart vertical columns of horizontal struts along the inner and outer walls of the vacuum vessel, with a plurality of vertically spaced apart horizontal struts in each column;

each strut having opposing ends; and operatively joining one strut end through a ball and socket type joint to a coil containment vessel wall and operatively joining the other end of the strut through a ball and socket type joint to a vacuum vessel wall.

54. A method to claim 49 in which:

each strut tubular and is fabricated of composite non-electrically conducting material having a low heat conducting capacity.

55. A method according to claim 40 including:

positioning a generally cylindrical shaped thermal shroud between the coil containment vessel and the vacuum vessel, with the shroud surrounding the coil containment vessel and with the vacuum vessel surrounding the shroud.

56. A method according to claim 49 including:

positioning a generally cylindrical shaped thermal shroud between the coil containment vessel and the vacuum vessel;

positioning the struts so they penetrate the shroud; and positioning thermal intercept means so that it communicates with the thermal shroud and with many of the struts so as to extract heat and decrease the amount of heat leak to the coil containment vessel.

57. A superconducting magnetic energy storage apparatus comprising:

a generally cylindrical shaped superconducting coil structure;

the coil structure having an inner circumferential face, an outer circumferential face and a bottom face;

a generally cylindrical shaped coil containment vessel, surrounding and enclosing the coil structure, and adapted to hold a liquid;

the coil containment vessel having an inner circumferential wall spaced inward of the coil structure inner circumferential face;

the coil containment vessel having an outer circumferential wall, spaced outward of the coil structure outer circumferential face;

the coil containment vessel having a bottom wall spaced downward of the coil structure bottom face;

a generally cylindrical shaped vacuum vessel surrounding and enclosing the coil containment vessel;

the vacuum vessel being located in a restraining structure having an inner circumferential wall, an outer circumferential wall and a floor;

the vacuum vessel having an outer circumferential wall spaced inward of the restraining structure outer circumferential wall;

the vacuum vessel having an inward circumferential wall spaced radially outward of the restraining structure inner circumferential wall;

the vacuum vessel having a bottom spaced downward of the coil containment vessel bottom wall;

coil support means supporting the coil structure bottom face above the coil containment vessel bottom wall;

substantially horizontal compression member means between the coil structure outer face and the coil containment vessel outer wall, and substantially horizontal compression member means between the coil structure inner face and the coil containment vessel inner wall;

substantially horizontal cold to warm compression member means between the coil containment vessel outer wall and the vacuum vessel outer wall and substantially horizontal compression member means between the coil containment vessel inner wall and the vacuum vessel inner wall;

compression bearing means, on the outside of the vacuum vessel outer wall, aligned with compression bearing means on the restraining structure outer wall;

compression bearing means, on the outside of the vacuum vessel inner wall, aligned with compression bearing means on the restraining structure inner wall;

the compression members being dimensioned such that when the coil containment vessel is loaded with a liquid cryogen, the vacuum vessel is evacuated to an operable system vacuum and the coil structure is substantially loaded with electrical energy, the outwardly directed compressive force exerted by the resulting magnetic energy causes the compression bearing means on the outside of the outer wall of the vacuum vessel to contact, and transfer the compressive load to, the compression bearing means on the restraining structure outer wall; and when the coil structure has a minimal electrical energy load and the compression bearing means on the outside of the inner wall of the vacuum vessel contacts the compression bearing means on the restraining structure inner wall, a radial inwardly directed compressive force is exerted by the coil causing the compression bearing means on the outside of the inner wall of the vacuum vessel to contact the compression bearing means on, and transfer the radial inward directed compressive load to, the restraining structure inner wall.

58. A superconducting magnetic energy storage apparatus comprising:

a generally cylindrical shaped superconducting coil structure;

the coil structure having an inner circumferential face, an outer circumferential face and a bottom face;

a generally cylindrical shaped coil containment vessel, surrounding and enclosing the coil structure, and adapted to hold a liquid;

the coil containment vessel having an inner circumferential wall spaced inward of the coil structure inner circumferential face;

the coil containment vessel having an outer circumferential wall, spaced outward of the coil structure outer circumferential face;

the coil containment vessel having a bottom wall spaced downward of the coil structure bottom face;

a generally cylindrical shaped vacuum vessel surrounding and enclosing the coil containment vessel;

the vacuum vessel being located in a restraining structure having an inner circumferential wall, an outer circumferential wall and a floor;

the vacuum vessel having an outer circumferential wall spaced inward of the restraining structure outer circumferential wall;

the vacuum vessel having an inward circumferential wall spaced radially outward of the restraining structure inner circumferential wall;

the vacuum vessel having a bottom spaced downward of the coil containment vessel bottom wall;

coil support means supporting the coil structure bottom face above the coil containment vessel bottom wall;

substantially horizontal compression member means between the coil structure outer face and the coil containment vessel outer wall, and substantially horizontal compression member means between the coil structure inner face and the coil containment vessel inner wall;

substantially horizontal cold to warm compression member means between the coil containment vessel outer wall and the vacuum vessel outer wall and substantially horizontal compression member means between the coil containment vessel inner wall and the vacuum vessel inner wall;

compression bearing means, on the outside of the vacuum vessel outer wall, aligned with compression bearing means on the restraining structure outer wall;

compression bearing means, on the outside of the vacuum vessel inner wall, aligned with compression bearing means on the restraining structure inner wall;

the compression members being dimensioned such that when the coil containment vessel is loaded with a liquid cryogen, the vacuum vessel is evacuated to an operable system vacuum and the coil structure is substantially loaded with electrical energy, the outwardly directed compressive force exerted by the resulting magnetic energy causes the compression bearing means on the outside of the outer wall of the vacuum vessel to contact, and transfer the compressive load to, the compression bearing means on the restraining structure outer wall; and when the coil structure has a minimal electrical energy load and the compression bearing means on the outside of the inner wall of the vacuum vessel contacts the compression bearing means on the restraining structure outer wall, the compression bearing means on the outside of the inner wall of the vacuum vessel is spaced radial outwards form, and out of contact with, the compression bearing means on the restraining structure inner wall.

59. A superconducting magnetic energy storage apparatus comprising:

a generally cylindrical shaped superconducting coil structure;

the coil structure having an inner circumferential face, an outer circumferential face and a bottom face;

a generally cylindrical shaped coil containment vessel, surrounding and enclosing the coil structure, and adapted to hold a liquid;

the coil containment vessel having an inner circumferential wall spaced inward of the coil structure inner circumferential face;

the coil containment vessel having an outer circumferential wall, spaced outward of the coil structure outer circumferential face;

the coil containment vessel having a bottom wall spaced downward of the coil structure bottom face;

a generally cylindrical shaped vacuum vessel surrounding and enclosing the coil containment vessel;

the vacuum vessel being located in a restraining structure having an inner circumferential wall, an outer circumferential wall and a floor;

the vacuum vessel having an outer circumferential wall spaced inward of the restraining structure outer circumferential wall;

the vacuum vessel having an inward circumferential wall spaced radially outward of the restraining structure inner circumferential wall;

the vacuum vessel having a bottom spaced downward of the coil containment vessel bottom wall;

coil support means supporting the coil structure bottom face above the coil containment vessel bottom wall;

substantially horizontal compression member means between the coil structure outer face and the coil containment vessel outer wall, and substantially horizontal compression member means between the coil structure inner face and the coil containment vessel inner wall;

substantially horizontal cold to warm compression member means between the coil containment vessel outer wall and the vacuum vessel outer wall and substantially horizontal compression member means between the coil containment vessel inner wall and the vacuum vessel inner wall;

compression bearing means, on the outside of the vacuum vessel outer wall, aligned with compression bearing means on the restraining structure outer wall;

compression bearing means, on the outside of the vacuum vessel inner wall, aligned with compression bearing means on the restraining structure inner wall;

the comrpession members being dimensioned such that when the coil containment vessel is loaded with a liquid cryogen, the vacuum vessel is evacuated to an operable system vacuum and the coil structure is substantially loaded with electrical energy, the outwardly directed compressive force exerted by the resulting magnetic energy causes the compression bearing means on the outside of the outer wall of the vacuum vessel to contact, and transfer the compressive load to, the compression bearing means on the restraining structure outer wall; and the compression member means is dimensioned such that when the coil containment vessel is loaded with a liquid cryogen, the vacuum vessel is evacuated to an operable system vacuum and the coil structure is essentially void of electrical energy, a radial inwardly directed compressive force is exerted causing the compression bearing means on the outside of the inner wall of the vacuum vessel to contact the compression bearing means on, and transfer the radial inwardly directed compressive load to, the restraining structure inner wall.

60. A superconducting magnetic energy storage apparatus comprising:

a generally cylindrical shaped superconducting coil structure;

the coil structure having an inner circumferential face, an outer circumferential face and a bottom face;

a generally cylindrical shaped coil containment vessel, surrounding and enclosing the coil structure, and adapted to hold a liquid;

the coil containment vessel having an inner circumferential wall spaced inward of the coil structure inner circumferential face;

the coil containment vessel having an outer circumferential wall, spaced outward of the coil structure outer circumferential face;

the coil containment vessel having a bottom wall spaced downward of the coil structure bottom face;

a generally cylindrical shaped vacuum vessel surrounding and enclosing the coil containment vessel;

the vacuum vessel being located in a restraining structure having an inner circumferential wall, an outer circumferential wall and a floor;

the vacuum vessel having an outer circumferential wall spaced inward of the restraining structure outer circumferential wall;

the vacuum vessel having an inward circumferential wall spaced radially outward of the restraining structure inner circumferential wall;

the vacuum vessel having a bottom spaced downward of the coil containment vessel bottom wall;

coil support means supporting the coil structure bottom face above the coil containment vessel bottom wall;

substantially horizontal compression member means between the coil structure outer face and the coil containment vessel outer wall, and substantially horizontal compression member means between the coil structure inner face and the coil containment vessel inner wall;

substantially horizontal cold to warm compression member means between the coil containment vessel outer wall and the vacuum vessel outer wall and substantially horizontal compression member means between the coil containment vessel inner wall and the vacuum vessel inner wall;

compression bearing means, on the outside of the vacuum vessel outer wall, aligned with compression bearing means on the restraining structure outer wall;

compression bearing means, on the outside of the vacuum vessel inner wall, aligned with compression bearing means on the restraining structure inner wall;

the comrpession members being dimensioned such that when the coil containment vessel is loaded with a liquid cryogen, the vacuum vessel is evacuated to an operable system vacuum and the coil structure is substantially loaded with electrical energy, the outwardly directed compressive force exerted by the resulting magnetic energy causes the compression bearing means on the outside of the outer wall of the vacuum vessel to contact, and transfer the compressive load to, the compression bearing means on the restraining structure outer wall; and when the coil structure is essentially void of electric energy the compression bearing means on the outside of the outer wall of the vacuum vessel is spaced from, and out of contact with, the compression bearing means on the restraining structure outer wall.

* * * * *